US010378562B2

(12) United States Patent
Sujanani et al.

(10) Patent No.: US 10,378,562 B2
(45) Date of Patent: Aug. 13, 2019

(54) COMBINATION DEVICE FOR LOCKOUT AND PARTIAL STROKE TEST OF VALVE ACTUATORS

(71) Applicant: Bray International, Inc., Houston, TX (US)

(72) Inventors: Prem Sujanani, Bangalore (IN); Satheesh Paramasivan, Bangalore (IN); Deepak Divakaran, Bangalore (IN); Santhosh Kumar, Bangalore (IN)

(73) Assignee: Bray International, Inc., Houston, TX (US)

( * ) Notice: Subject to any disclaimer, the term of this patent is extended or adjusted under 35 U.S.C. 154(b) by 245 days.

(21) Appl. No.: 15/225,515

(22) Filed: Aug. 1, 2016

(65) Prior Publication Data

US 2017/0030382 A1 Feb. 2, 2017

Related U.S. Application Data

(60) Provisional application No. 62/198,778, filed on Jul. 30, 2015.

(51) Int. Cl.
F15B 15/26 (2006.01)
F15B 19/00 (2006.01)
(Continued)

(52) U.S. Cl.
CPC ............ F15B 15/26 (2013.01); F15B 15/24 (2013.01); F15B 15/261 (2013.01); F15B 19/00 (2013.01);
(Continued)

(58) Field of Classification Search
CPC .. F15B 15/26; F15B 15/261; F15B 2015/267; F15B 15/066; F15B 2211/72
See application file for complete search history.

(56) References Cited

U.S. PATENT DOCUMENTS 2,811,136 A * 10/1957 Westcott, Jr. ........... B64C 25/22
244/102 SL
3,589,245 A * 6/1971 Boyle ................... F15B 15/261
74/527
(Continued)

FOREIGN PATENT DOCUMENTS

WO 2013109184 7/2013

OTHER PUBLICATIONS

Asensio Estrada, G, International Search Report, dated Nov. 8, 2016, 4 pages, European Patent Office, Rijswijk, The Netherlands.
(Continued)

Primary Examiner — F Daniel Lopez
(74) Attorney, Agent, or Firm — Oathout Law Firm; Mark A. Oathout; Laura Tu

(57) ABSTRACT

The disclosure relates to exemplary embodiments for a combination device configured to effect lockout and partial stroke testing for an actuator having a piston rod providing linear motion and connected to a guide block in an actuator, wherein the combination device includes a device housing having a housing bore, wherein the device housing is adapted to mount on a receptacle on the actuator that aligns a device housing bore coaxially to the translatory motion axis of the piston rod; an extension rod attached to the guide block connected to the piston rod; at least two slides or a profiled bore index sleeve disposed in the device housing that when engaged provide means of restraining the movement of the extension rod in a manner that prevents said extension rod and a driver element of the actuator from rotating, relative to an actuator housing; a housing cover mounted over the device housing wherein the housing cover protects and retains the extension rod, and the slides or the index sleeve in the device housing and a spring biased safety pin mounted on the housing cover wherein the spring biased
(Continued)

safety pin is configured to prevent unintended actuation of the actuator; and a tubular cover to protect the extension rod.

22 Claims, 37 Drawing Sheets

(51) Int. Cl.
    *F16K 31/163* (2006.01)
    *F16K 35/02* (2006.01)
    *F16K 35/06* (2006.01)
    *F15B 15/24* (2006.01)
    *F16K 1/50* (2006.01)
    *F16K 1/52* (2006.01)
    *F15B 15/06* (2006.01)

(52) U.S. Cl.
    CPC ............. *F15B 19/002* (2013.01); *F16K 1/50* (2013.01); *F16K 1/523* (2013.01); *F16K 31/1635* (2013.01); *F16K 35/022* (2013.01); *F16K 35/025* (2013.01); *F16K 35/06* (2013.01); *F15B 15/066* (2013.01); *F15B 2015/267* (2013.01)

(56) References Cited

U.S. PATENT DOCUMENTS

| | | | | |
|---|---|---|---|---|
| 4,343,235 | A | * | 8/1982 | Jones .................... F15B 15/261 100/204 |
| 4,700,814 | A | * | 10/1987 | Mitchell ................ F15B 15/261 188/170 |
| 5,116,018 | A | | 5/1992 | Friemoth et al. |
| 5,329,959 | A | | 7/1994 | Owen et al. |
| 6,105,484 | A | | 8/2000 | Kalthoff et al. |
| 6,640,688 | B1 | | 11/2003 | Harper |
| 6,935,610 | B1 | | 8/2005 | DeBruyne |
| 7,779,972 | B2 | * | 8/2010 | Inagaki .................... F16D 65/22 188/106 F |

OTHER PUBLICATIONS

Asensio Estrada, G, Written Opinion of the International Searching Authority, dated Nov. 8, 2016, 7 pages, European Patent Office, Rijswijk, The Netherlands.

* cited by examiner

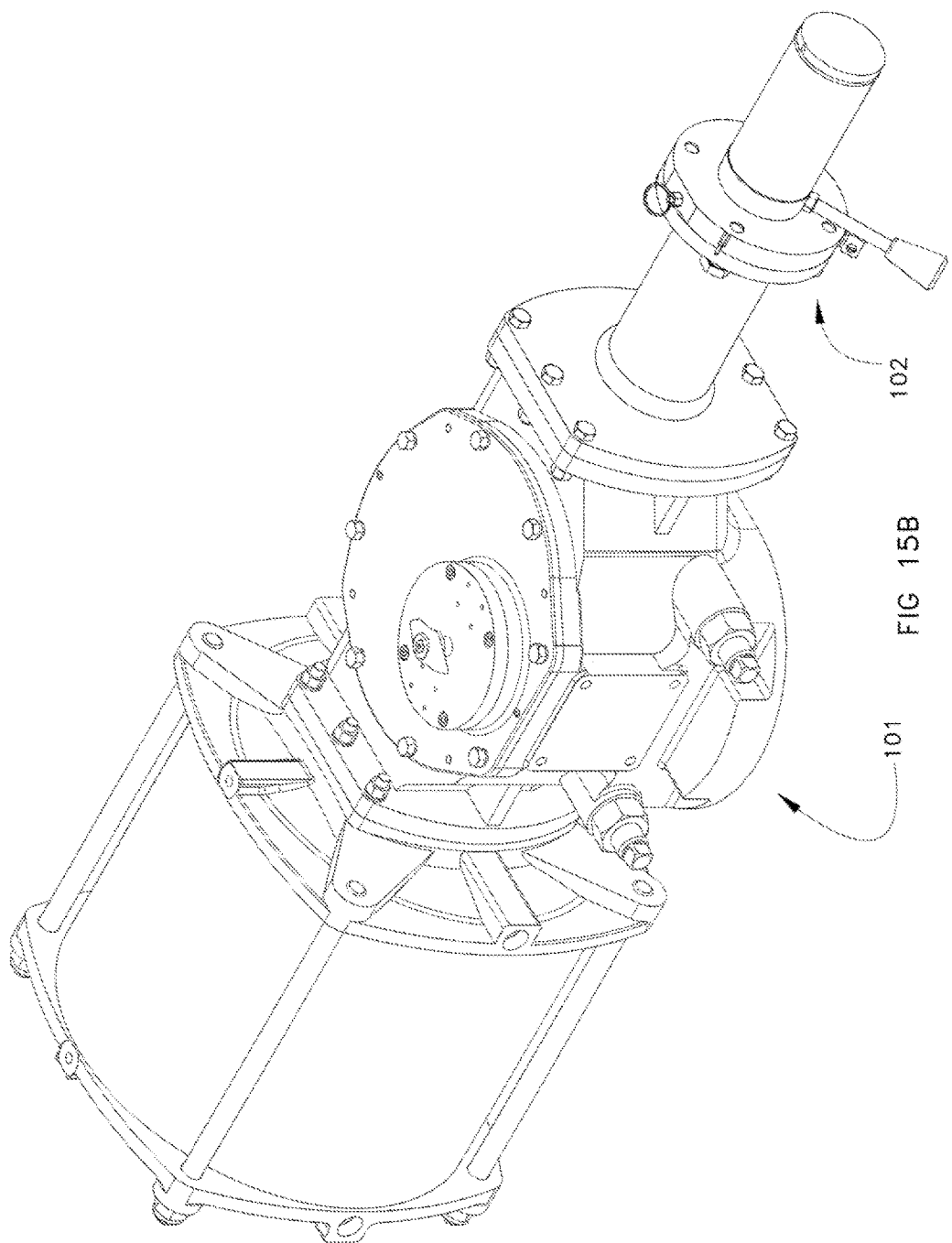

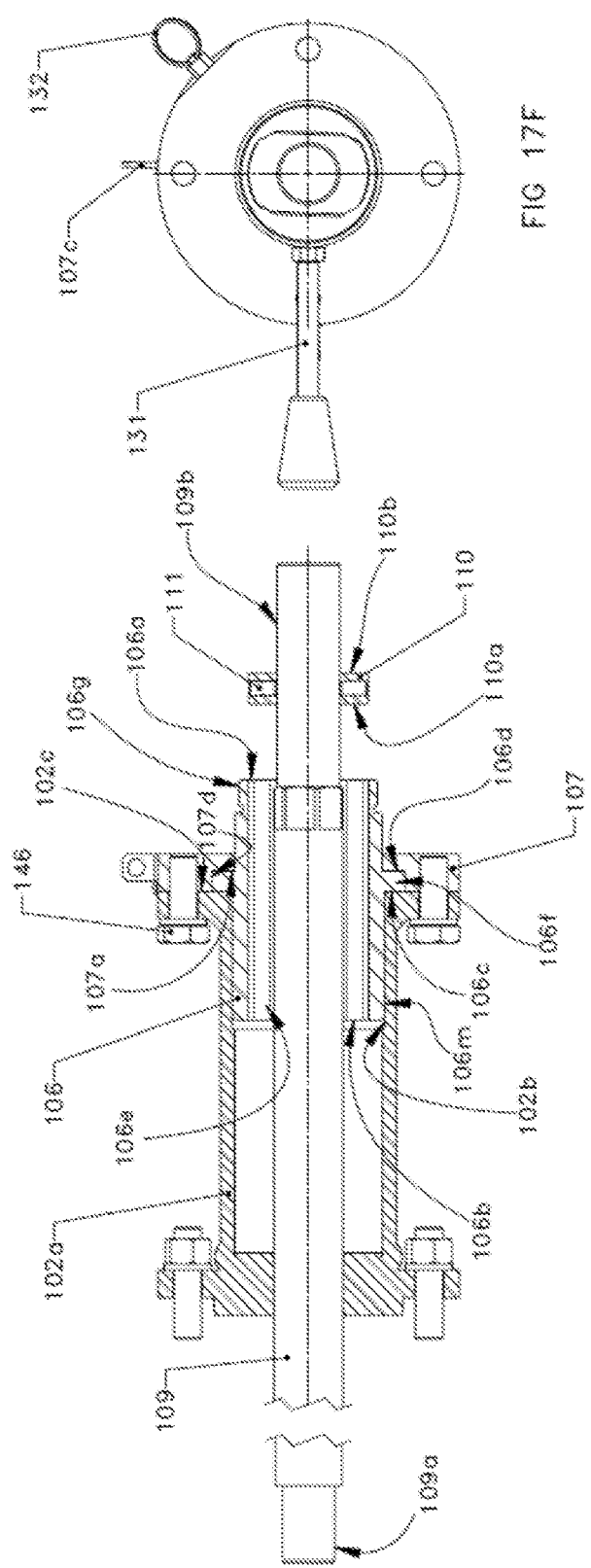

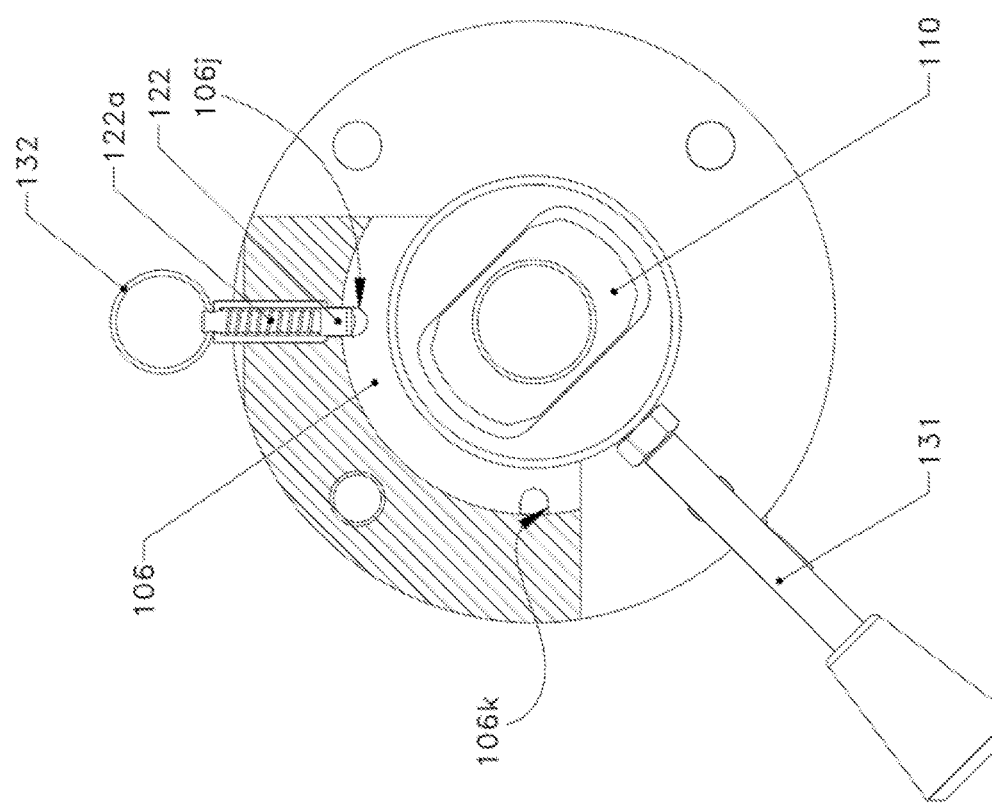

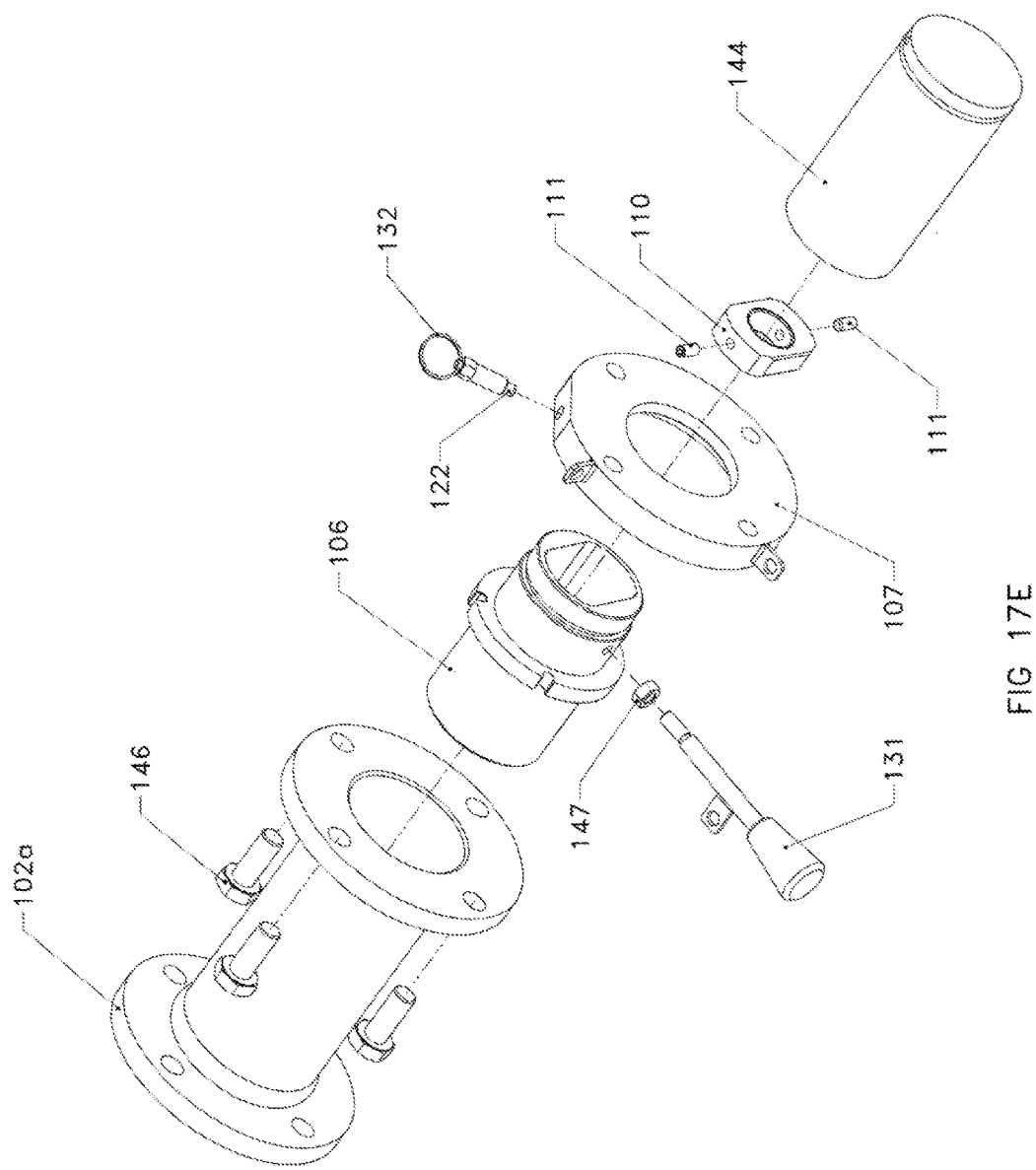

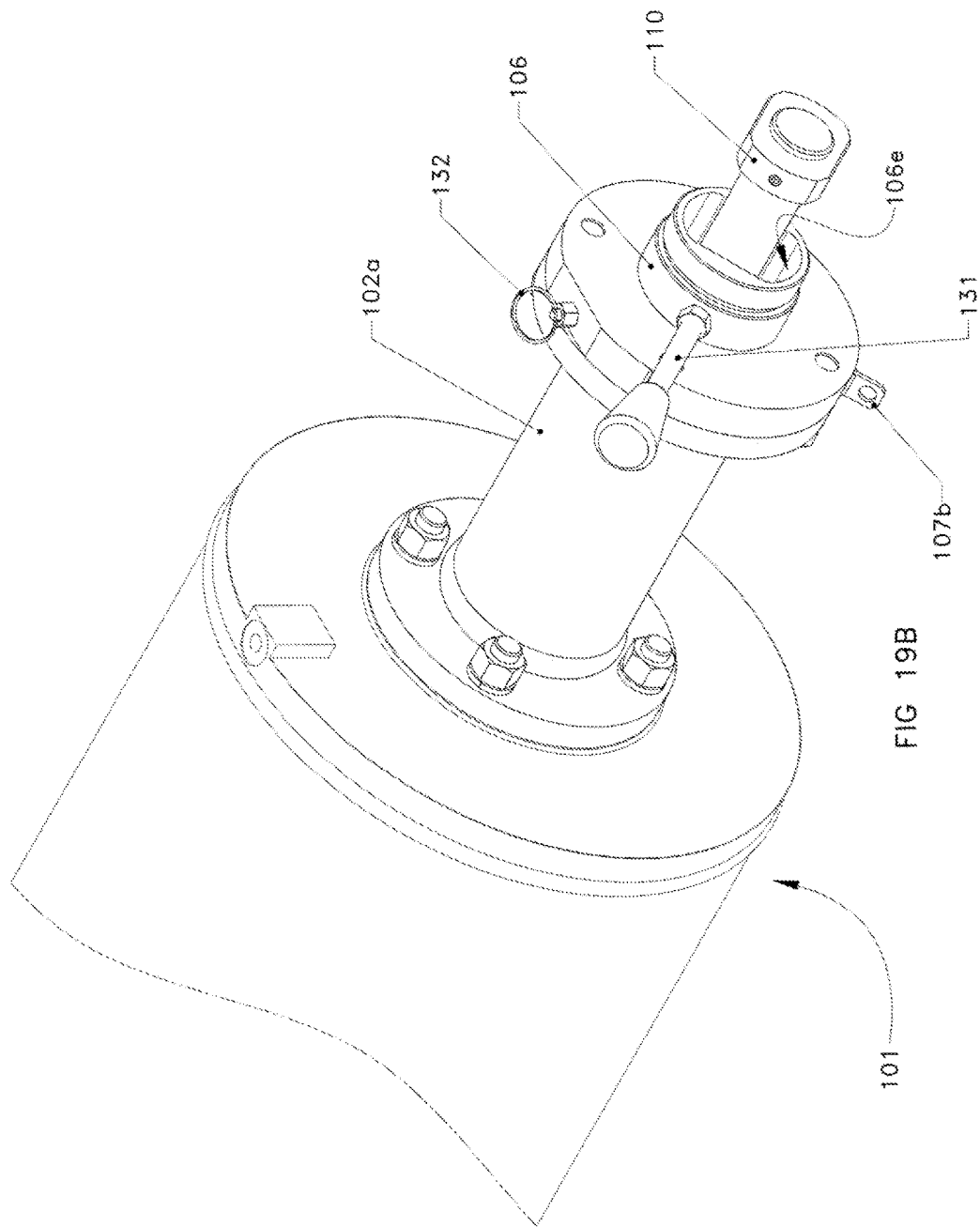

COMBINATION DEVICE FOR LOCKOUT AND PARTIAL STROKE TEST OF VALVE ACTUATORS

BACKGROUND

Technical Field: The disclosure relates to the field of lockout devices for preventing the operation of a valve actuator and to the field of valve partial stroke test devices, which permit only a pre-determined extent of motion for the valve actuator.

Safety equipment in industrial process plants with piping and valve installations typically include emergency shutdown valves (hereinafter, also "ESD valves"), blow off valves and bypass valves to prevent pressure build up in upstream or downstream sections. These valves normally remain open or closed but are actuated quickly to isolate sections of piping to stop further flow or bypass the flow, for emergency safety reasons. Actuation on ESD valves use fail-close actuator that is biased to close the valve, which is normally maintained in an open position by pneumatic pressure. These valves automatically close by the spring action or by reserve pneumatic supply upon loss of line air pressure due to a pressure system failure or in response to an emergency shutdown command signal. Regulations mandate periodic testing of such safety-instrumented systems to ensure the valve and all control elements are fully operational in an emergency.

Partial stroke testing (hereinafter, also "PST") devices fulfill this testing requirement without having to shut down the valve fully, which may disrupt or be detrimental to the normal process. A typical PST device is sandwiched between the valve and the actuator with a mechanical stop engaged to permit only a partial rotary motion of the valve operating member, or has a mechanical stop inserted into the translatory (meaning of, relating to, or involving uniform motion in one direction) path of the pneumatic actuator's piston rod, permitting only partial linear stroke.

However, the operational safety also demands lockout devices that are required to prevent the actuator from operating under the fluid power during maintenance and repairs. This typically is met by an additional device and often suffers from being singular in its orientation and point of action, whereas the actuators are invariably provided with an over travel adjustment to compensate for the valve's true closing position. The challenge has been to combine all such requirements with a compensating mechanism to match the locking position of the actuator to the valve's true closed position, after having adjusted the actuator's travel stops.

A solution to provide a combination device with its unique mechanism to compensate variability in the valve's true closing position and perform both of these said functions either by manual or remote operation, is the subject matter of this disclosure. Advantageous elaborations or embodiments of the disclosure are the objects of the present disclosure.

Some examples of prior art on lockout and partial stroke valve test apparatus are shown in FIG. 20, FIG. 21 and FIG. 22.

FIG. 20 shows a typical mechanical device that is fitted between the actuator and a rotary valve, the coupler shaft connects the valve's stem to the actuator's drive element. Rotary motion of the valve's drive member is restrained completely by a stopper bolt engaged in the device housing and the end of the stopper bolt locates into a hole or recess in the coupler shaft to lockout the rotary motion of the coupler and thereby the actuator and the valve. The device may further be locked out by engaging a lock pin through the housing and the stopper bolt and a padlock engaged into the lock pin. These device types are singular in their function as only a lockout apparatus and do not perform the partial stroke valve test.

FIG. 21 shows an arrangement to engage a stopper pin in the path of the actuator's piston rod or its extension thereof, to restrict the linear motion of the piston rod in a partial stroke valve test device. The spring return stroke is restricted to a small predetermined extent when the stopper pin is inserted in the device's housing, as the end face of the piston rod contacts the stopper pin after the partial stroke and is mechanically restrained by the pin from further motion.

FIG. 22 shows a partial stroke valve test device that is fitted between a rotary valve and the actuator with the device's coupler shaft adapted to connect the valve's stem to the actuator's drive member. The device typically has this coupler shaft keyed to a rotary member, segmented to provide a radial planar surface that bears on a cam stopper which when engaged, blocks the rotary motion of the segment and thereby the actuator and valve. The two extreme positions of the cam shaft select between the operation or test modes of the device. These device types are singular in their function as only a partial stroke valve test apparatus and do not lock out the actuator.

BRIEF SUMMARY

The present disclosure relates to embodiments for a reliable and rugged mechanical device which when adapted to a fluid powered valve actuator, performs dual functions of a lockout and a partial stroke test device, capable of withstanding the full force of the pneumatic actuator. Configured as a lockout device, it prevents a pneumatic cylinder actuator's linear motion when the cylinder is pressurized.

This disclosure pertains to the mechanisms on an exemplary embodiment of a single mechanical device that combines the functionality of a lockout device which prevents a valve pneumatic actuator from operating by fluid power in one mode and as a partial stroke valve test device in the other mode, which permits only a pre-determined extent of actuator's motion.

The partial stroke test device finds most common use in testing for the anticipated response of the controls on a valve actuator in a fault insertion test. Such a device shall permit only a small movement of the valve stem so as not to adversely affect the pipeline flow and process parameters. This disclosure makes such a device easily field-configurable to a double as a lockout device too, that prevents motion of the actuator when so called for during maintenance.

In one aspect as a lockout apparatus, the device has an activation mechanism to prevent linear motion of the actuator's piston rod and is set to lock the actuator and thereby the valve is locked in an open or closed position, normally at the stroke end. This can be further locked out in either position with a padlock to ensure the actuator on the process valve is not operated inadvertently or by unauthorized personnel.

In another aspect as a partial stroke valve testing device, the mechanism enables easy field adjustment, which permits the actuator a pre-determined stroking before blocking further movement. The activation mechanism has further options of local operation by a manual lever or by a small short stroke pneumatic cylinder, for remote operation.

One example of a lockout device in accordance with the present disclosure includes the device housing, two slides with linkages and pins, an actuating plunger, housing cover and an extension rod with an adjustable stopper nut. The device mounting adaptation bolts up on the actuator's housing. The extension rod is threaded at one end, which engages into one side of the actuator's guide block that is fixedly connected to the piston rod on its other side, integrating the extension rod coaxially with the pneumatic cylinder's piston rod. The other end of the extension rod is stepped down and threaded till its end beyond the step. An adjustable thimble nut is threaded on this end, forming a groove between the extension rod's step face and the nut's inner face.

The extension rod fitted into the actuator's guide block at one end and the adjustable thimble nut on the other, passes through the device housing's bore unhindered in the normal operation of the actuator. The housing has two slides of thickness adapted to slide into the groove so formed by the extension rod's step and the thimble nut's faces. The two slides bear on the device housing on their rear face and their front faces bear on the actuating links and the housing cover. They move towards each other in the activated position or away from each other in de-activated position. This synchronized activating motion of these slides is accomplished by the linear movement of a plunger that is linked in an identical manner to each of these two slides through links and pinned joints. The sliding members have semi-circular cut-outs machined on their mating faces which envelope the step on the extension rod when the two slides are moved inwards into the locking position, by pulling outwards on the actuating plunger. In this locked position, the axial movement of the extension rod is constrained by the two slides that envelope the step and create an annular surface that the thimble nut bears on. The slides bear on the device housing and the thimble nut threaded on the extension rod bears on the slides, thereby blocking axial movement of the extension rod. Since the extension rod is coupled to the piston rod through a guide block in the actuator, the linear movement of the piston rod too is prevented and the actuator is locked out. Thus, this example of a lockout device in accordance with the present disclosure may be used to lock the pneumatic cylinder actuator in one of such several possible positions.

To restore normal operation mode and upon pushing the plunger inwards into the device housing, the slides move away from each other and their profile clears the boundary of the extension rod and the adjusting thimble nut, thereby letting the extension rod with the thimble nut slide freely through the device housing.

The same exemplary device configured as a partial stroke valve testing device has the thimble nut backed off on the extension rod threads to create a wide groove between the extension rod step face and the thimble nut inside face. The actuation of the plunger outwards from the device housing to effect the synchronized movement of the slides towards each other to engage the test mode or outwards to disengage the test mode remains the same as in the case of the lockout configuration of the device. However, now the extension rod can move axially under the influence of the pressure applied to the pneumatic cylinder of the actuator, to the extent of the width of the groove so formed by manual adjustment of the thimble nut. The stroke of the piston rod is now permitted for only the width of this groove thus providing an arrangement for partial stroking of the actuator.

The plunger's position is further secured at its' two end positions by the provision of a safety stop to prevent inadvertent engagement of the operational and testing positions. A spring biased pin radially engages a collared nut threaded on the plunger, thereby preventing the plunger's movement unless the safety stop pin is selectively disengaged for the movement of the plunger for the test position or the operational position.

A manual lever with linkages to operate the plunger is provided to effect the plunger movement effortlessly. A provision is made to lock this manual lever in its two extreme positions with a padlock, to prevent unauthorized operation of the device.

A variant of this exemplary device to operate the lockout or the partial stroke test functionality by remote operation has the manual lever replaced by a small pneumatic cylinder that is adapted to fit and be coupled to the plunger. The device operation is effected by remote signal to a solenoid valve that pneumatically operates this actuation cylinder, which in turn moves the plunger in or out to accomplish the lock-unlock functions. A feedback sensor adapted to the mounting of the cylinder returns the confirmation signal of the device's position to the central control unit for further processing and sequencing.

Another exemplary lockout device in accordance with the present disclosure includes the device housing, indexable sleeve with a double D profiled bore, an actuating lever, housing cover and an extension rod with an adjustable stop nut having a double D profile. The device mounting adaptation bolts up on the actuator's housing. The extension rod is threaded at one end suited to engage into one side of the actuator's guide block that is fixedly connected to the piston rod on its other side, integrating the extension rod coaxially with the pneumatic cylinder's piston rod. The other end of the extension rod is threaded for the required adjustment length and suited to a double D profiled adjustment nut.

The extension rod fitted into the actuator's guide block at one end and the double D profiled adjustable stop nut on the other, passes through the device housing's bore unhindered in the normal operation of the actuator. The index sleeve has a double D profiled bore of the same profile as the profiled adjustable stop nut, but only of slightly bigger dimensions so as to just let the adjustment nut slide through the profiled bore, unhindered. The two flat faces of the profiled nut are set coplanar to the flat faces in the index sleeve's profiled bore, for the normal operation (full stroke of the actuator). The index sleeve can be rotated in the device housing but restricted to only 90 degree rotation by a spring biased plunger pin that indexes into either of the two slots machined radially and 90 degrees apart on the flange of the index sleeve.

The indexation of the index sleeve from disengaged to the engaged position of the device is accomplished by turning on the hand lever that is fixedly attached to the outer end of index sleeve. When the index sleeve is turned clockwise to engage the device, the sleeve's double D bore profile gets offset to the adjustment nut's profile and this counter posed position prevents the adjustable stop nut from sliding through it. In this engaged position of the present exemplary device, the axial movement of the extension rod is constrained by the adjustment nut face bearing on the end face of the index sleeve. Since the extension rod is coupled to the piston rod through a guide block in the actuator, the linear movement of the piston rod too is prevented and the actuator is locked out. Thus, this exemplary lockout device in accordance with the present disclosure may be used to lock the pneumatic cylinder actuator in one of such several possible positions.

To restore normal operation mode and upon turning the lever to rotate the index sleeve 90 degrees counter clockwise, the sleeve's profiled bore comes back into alignment with the adjustment nut profile, thereby letting the adjustment nut and extension rod slide freely through the sleeve and device housing.

The same exemplary device when configured as a valve partial stroke testing device has the profiled adjustment nut backed off on the extension rod threads to create a gap between the index sleeve's outer face and the profiled adjustment nut's inside face. The actuation of a hand lever to effect the clockwise rotation of the index sleeve to engage the test mode or counter clockwise to disengage the test mode remains the same as in the case of the lockout configuration of the device. However, now the extension rod can move axially under the influence of the pressure applied to the pneumatic cylinder of the actuator, to the extent of the width of the gap so formed by manual adjustment of the adjustable stop nut. The stroke of the piston rod is now permitted for only the width of this gap thus providing an arrangement for partial stroking of the actuator.

The hand lever's travel is limited to its' two end positions by the provision of safety stops on the housing cover, to prevent over travel of the index sleeve while effecting device engagement or disengagement for the testing or operational positions, respectively. A spring biased pin radially engages in the index slots on the index sleeve's flange, to enable accurate positioning of the index sleeve in its two end positions and to prevent any inadvertent operation of the hand lever. The index sleeve is locked in its end positions, unless the safety spring biased plunger pin is selectively disengaged for the rotation of the index sleeve for either of the test position or the operational positions.

A hand lever to operate the device is provided to effortlessly effect the 90-degree rotation of the index sleeve. A provision is also made to positively lock this hand lever in its two extreme positions so determined by the safety stops on the housing cover, with a padlock to prevent unauthorized operation of the device.

BRIEF DESCRIPTION OF DRAWINGS

The embodiments may be better understood, and numerous objects, features, and advantages made apparent to those skilled in the art by referencing the accompanying drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

FIG. 15B shows a perspective view of a valve direct acting actuator fitted with an exemplary combination device.

FIG. 17A is the section view of an exemplary embodiment of the combination device, configured as a valve partial stroke testing device in a disengaged or operational position.

FIG. 17E is an exploded view of an exemplary embodiment of the combination device showing the parts comprising of the device, excluding the extension rod.

FIG. 17F is an end view taken from FIG. 17A.

FIG. 17G is an end view taken from FIG. 17B.

FIG. 19B is the perspective view of an exemplary embodiment of the combination mounted on a valve actuator, configured as a partial stroke test device in the engaged position at one end of the actuator's travel position.

DETAILED DESCRIPTION

Figure 1:
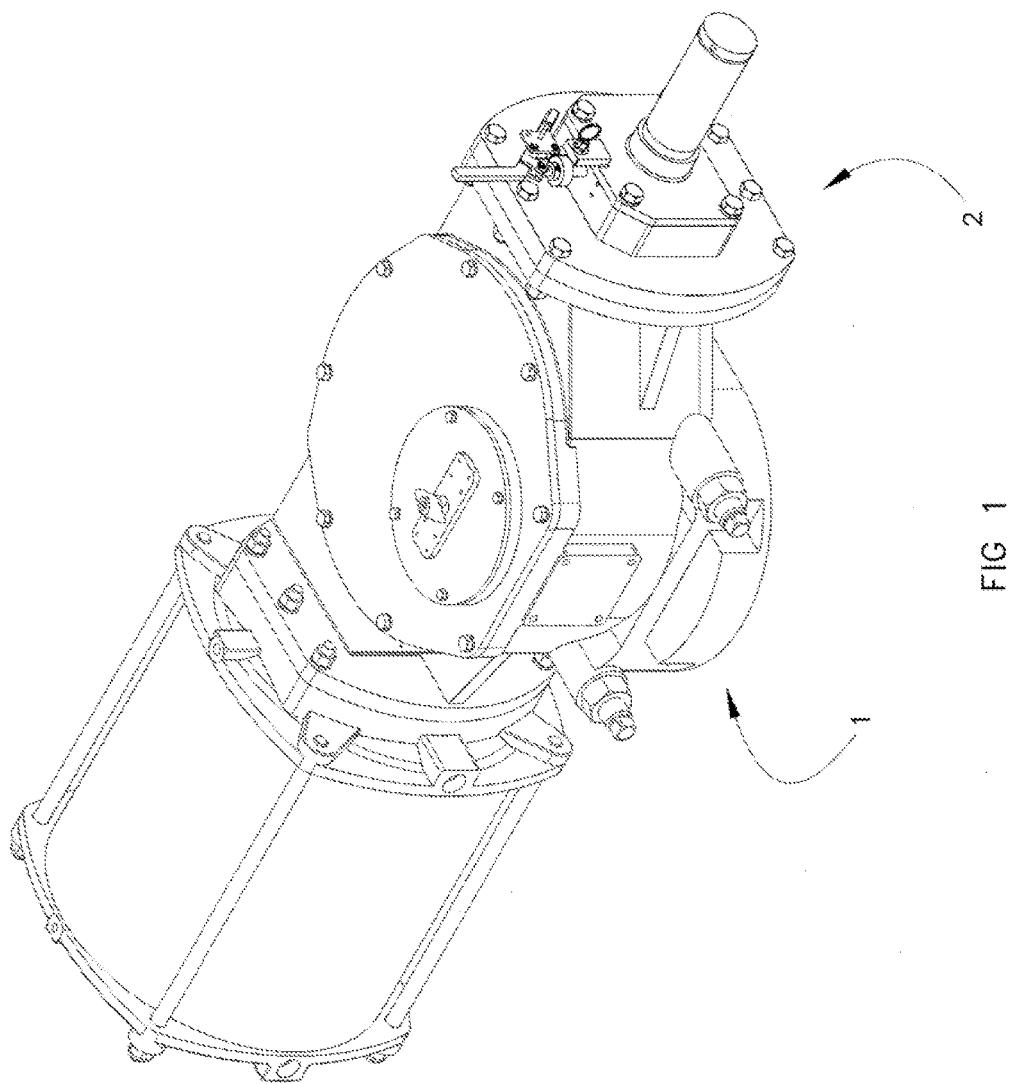
FIG. 1 shows a perspective view of an exemplary valve actuator fitted with the said combination device.

The description that follows includes exemplary apparatus, methods, techniques, and instruction sequences that embody techniques of the inventive subject matter. However, it is understood that the described embodiments may be practiced without these specific details.

An exemplary embodiment of an actuator 1 of scotch yoke type (e.g., such as a fluid powered cylinder actuator) on which an exemplary embodiment of a lockout and partial stroke test combination device 2, in accordance with the present disclosure, may be fitted is depicted in FIGS. 1 through 5. The disclosed improvements can be implemented into other types of actuators 1 (by way of example only, and not limited to, linear actuators). The exemplary actuator 1 is used for turning the flow control member of a quarter turn valve (not shown). The actuator 1 depicted here converts the linear motion of the piston 5 on application of fluid pressure on either side of the piston 5 to rotary motion of the actuator's 1 output drive member or drive element, namely yoke 3, by the scotch yoke mechanism of this exemplary actuator 1. It may be understood that the actuator 1 could be of rack and pinion style or a diaphragm style and so forth. It must also be understood that a lockout and partial stroke test combination device 2 in accordance with this disclosure may be used in combination with other cylinder actuator designs than those described herein, for example, on a linear valve actuator (not shown) and may also be used in combination with cylinder actuators (not shown) that are not employed for controlling the flow control member of a valve.

Figure 2:
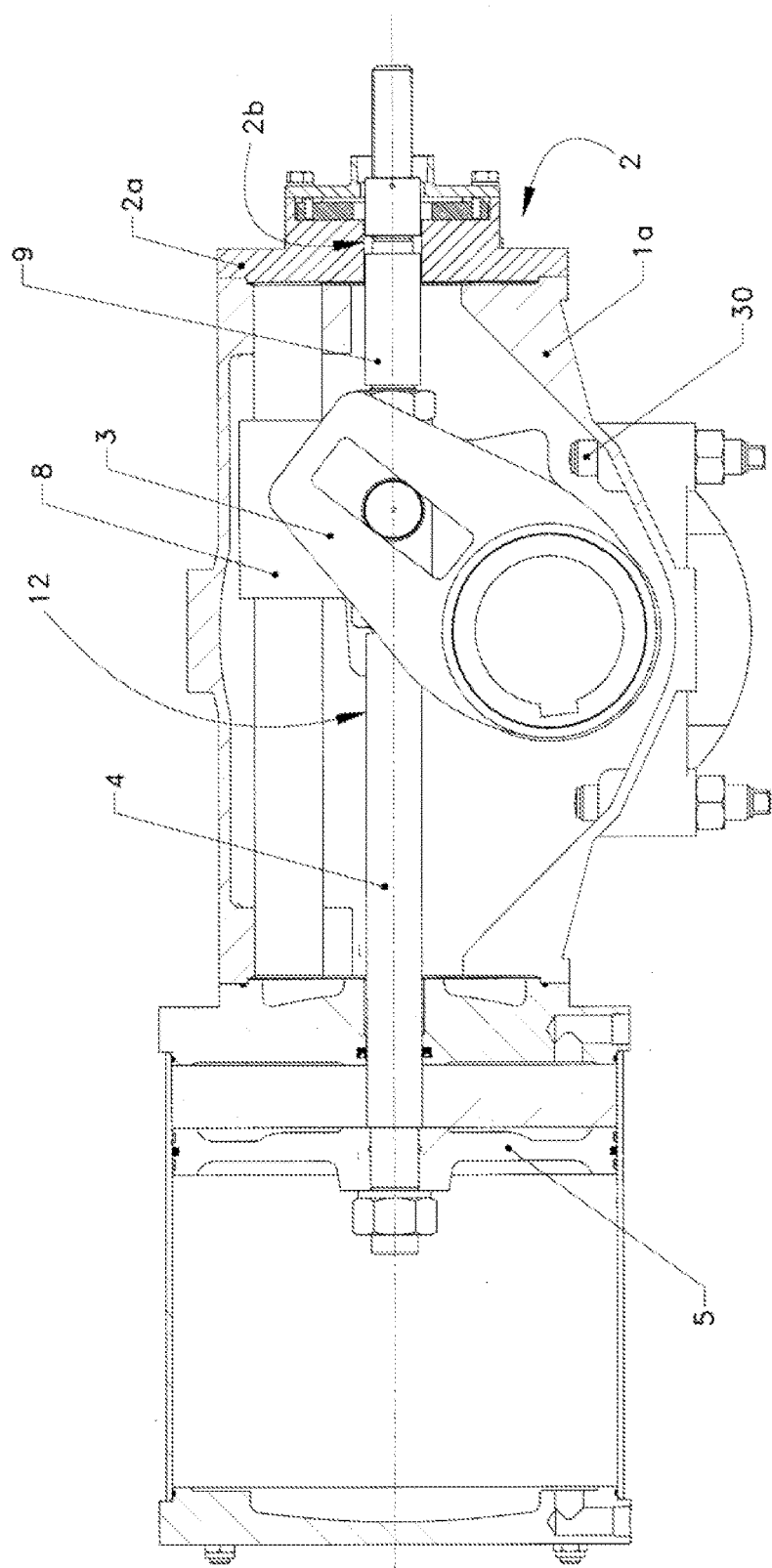
FIG. 2 shows a section view of an exemplary embodiment of the combination device mounted on a valve actuator, configured as a lockout device in unlocked position.
Figure 3:
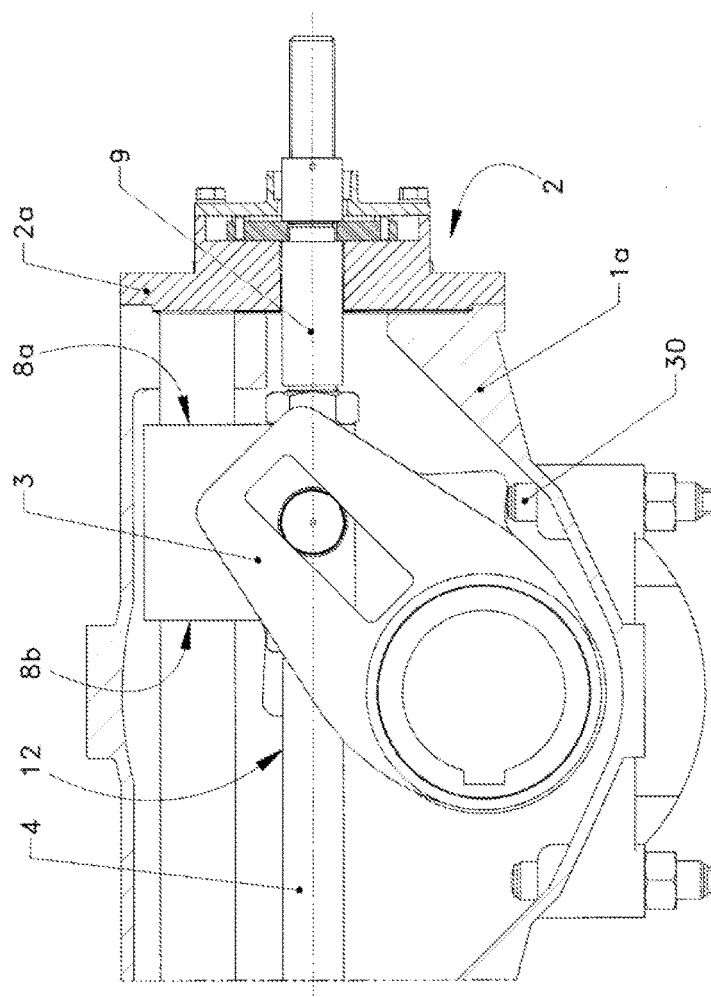
FIG. 3 shows a section view of an exemplary embodiment of the combination device mounted on a valve actuator, configured as a lockout device in locked position.
Figure 4:
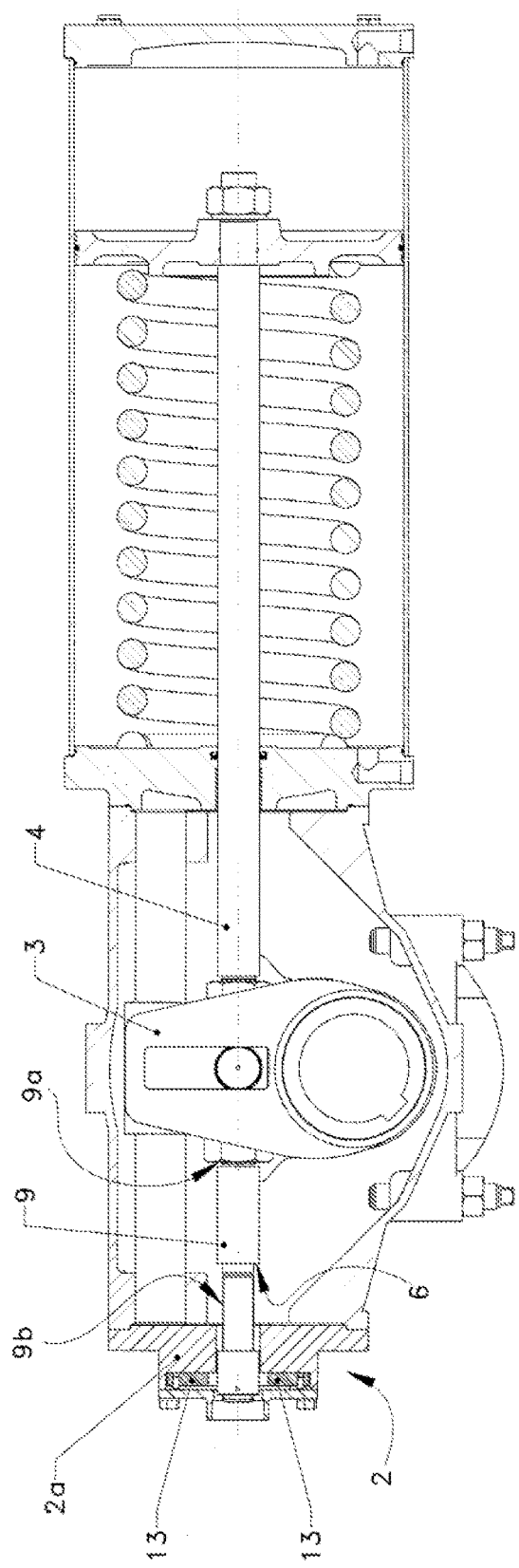
FIG. 4 is the section view of an exemplary embodiment of the actuator and combination device mounted on a valve actuator, configured as a partial stroke valve testing device in a disengaged or operational position.

FIG. 2 and FIG. 3 show the device housing 2a integrated with the adaptation to (or, adapted to) mount on the actuator housing 1a to receive and align the device 2 to the axis of the linear motion member 12 of the actuator 1, namely the cylinder piston rod 4. The extension rod 9 also forms the linear motion member 12, coaxial to the piston rod 4, coupled to the guide block 8 of the actuator 1 by threading and in the operation mode, the extension rod 9 freely passes through the lockout and partial stroke test combination device housing 2a, through the housing bore 2b, unhindered throughout the entire stroke of the actuator's 1 guide block 8.

Figure 5:
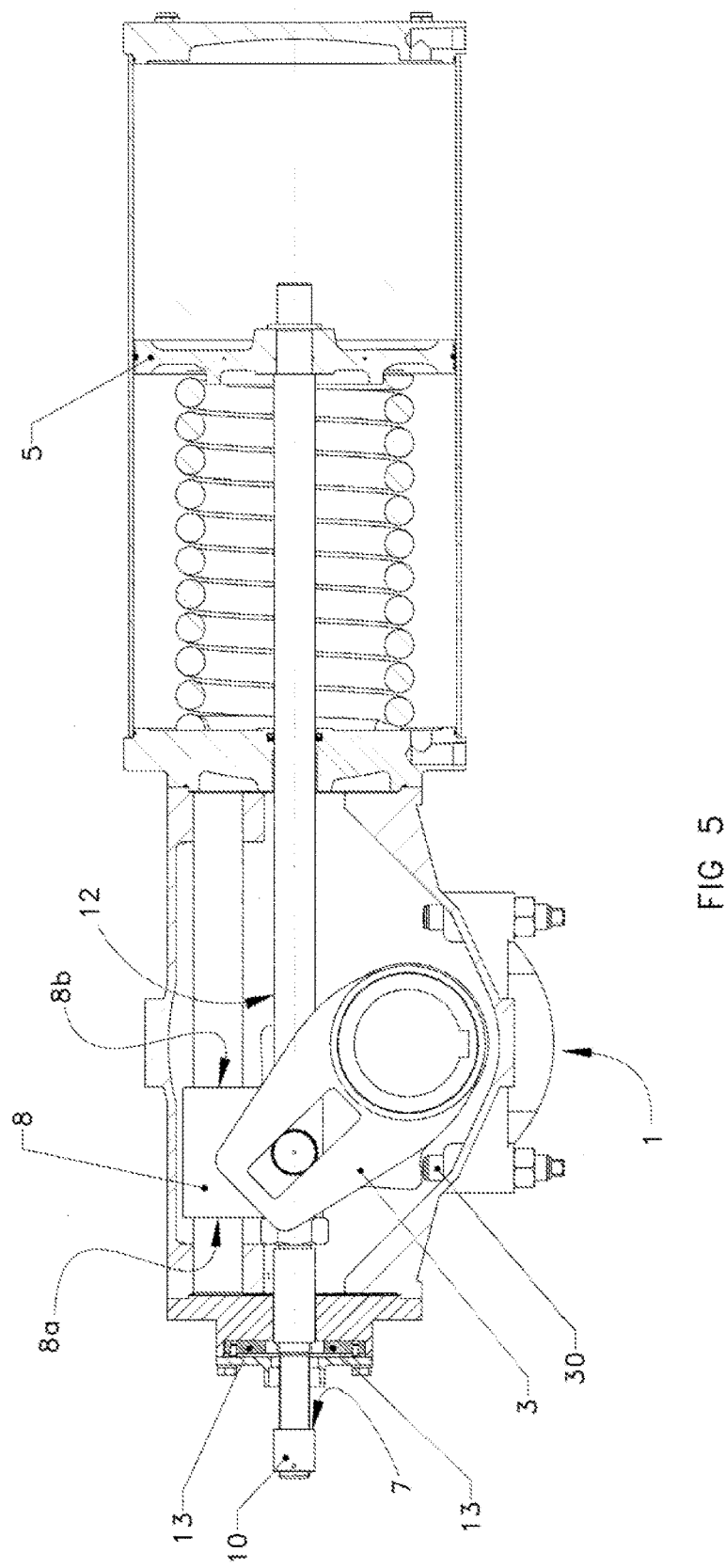
FIG. 5 is the section view of an exemplary embodiment of the actuator and combination device mounted on a valve actuator, configured as a partial stroke valve testing device in an engaged or testing position.
Figure 6:
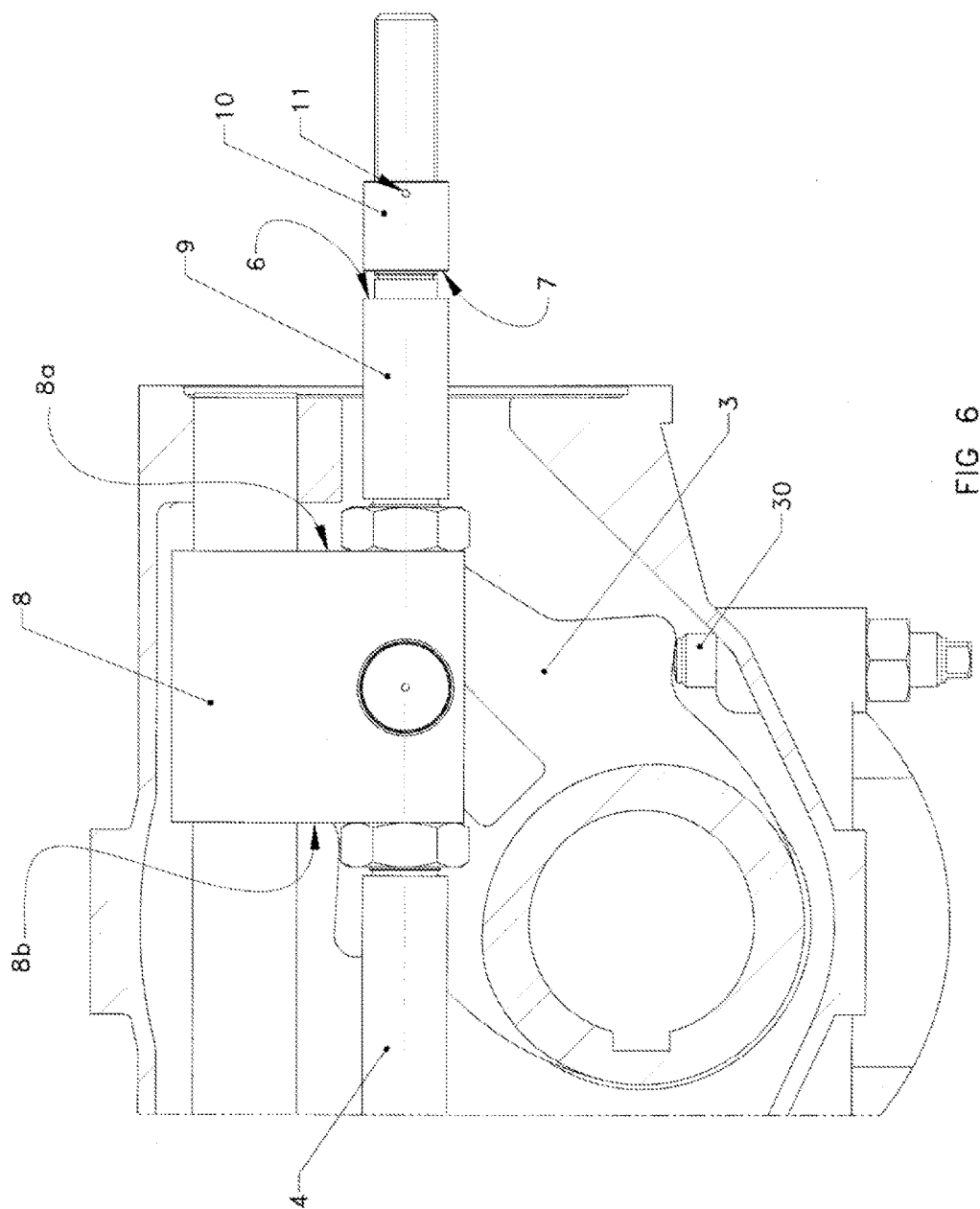
FIG. 6 shows a section view of an exemplary embodiment of the fitment of the extension rod of the device on to the guide block of the pneumatic actuator.

Referring to FIG. 5 and FIG. 6, the rotary motion of the yoke 3 is restrained by the actuator's 1 integral and adjustable travel stops or stop bolt 30 in the actuator 1. In the operation mode of FIG. 4, the restraining members of the device, namely the slides 13, are in their extreme outward retracted position (as radially retracted away from the linear motion of the extension rod 9) and do not impede the motion of the extension rod 9. The extension rod 9 is threaded at one end (9a) which engages and locks into one side 8a of the actuator's 1 guide block 8; the guide block 8 is also fixedly connected to the piston rod 4 on the other side 8b of the guide block 8, integrating the extension rod 9 coaxially with the pneumatic cylinder's piston rod 4. The other end 9b of the extension rod 9 is stepped down and threaded beyond. A thimble nut or fastener 10 is threaded on the other end 9b of the extension rod 9 for adjustment and positioning, forming a groove (or section of extension rod 9 having an outer diameter less than the outer diameter of the thimble nut 10) between the rod's 9 step face 6 and the thimble nut's 10 inner face 7.

Figure 7:
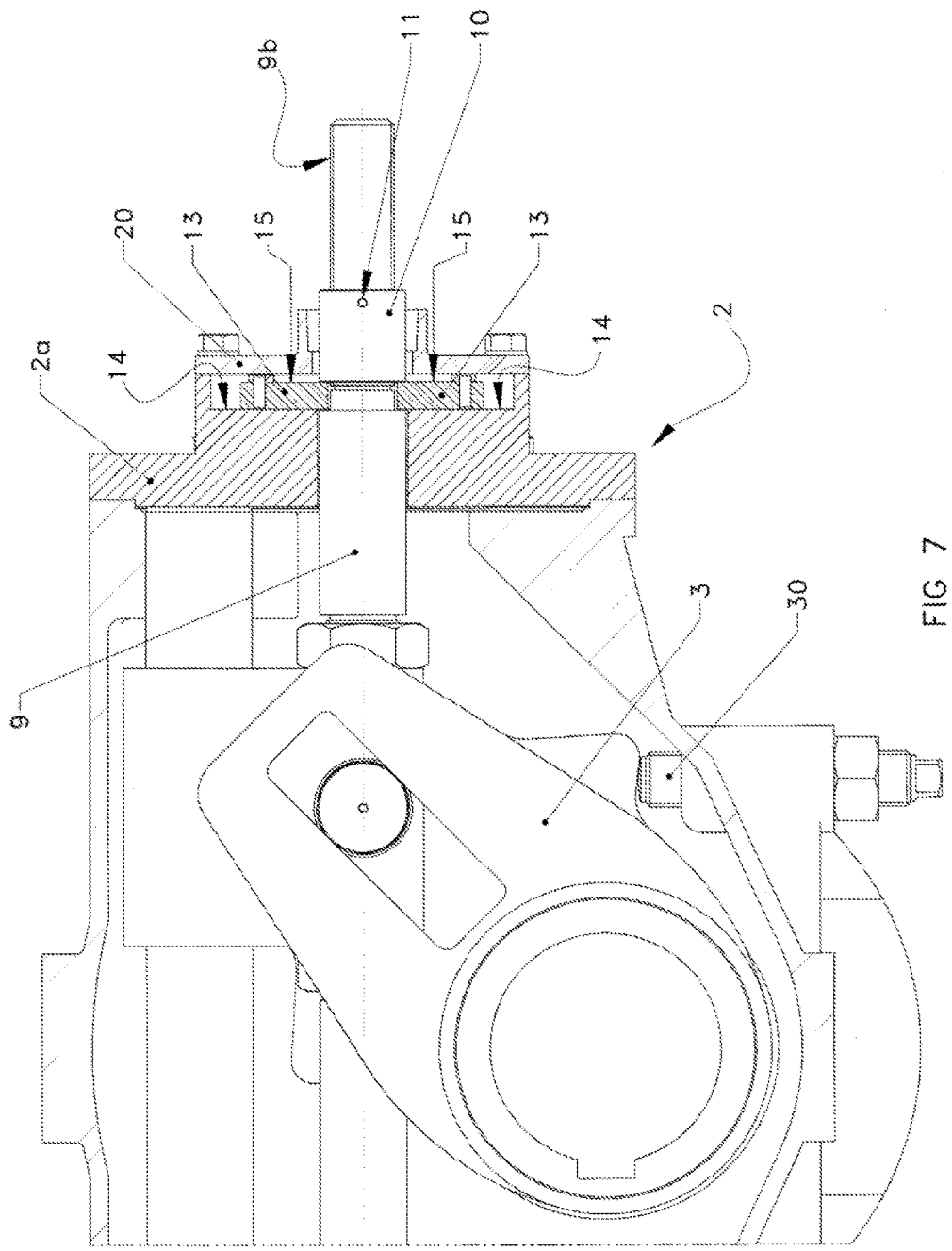
FIG. 7 shows the section view of an exemplary embodiment of the device housing and the locking elements engaged into the extension rod in locked out position.
Figure 8:
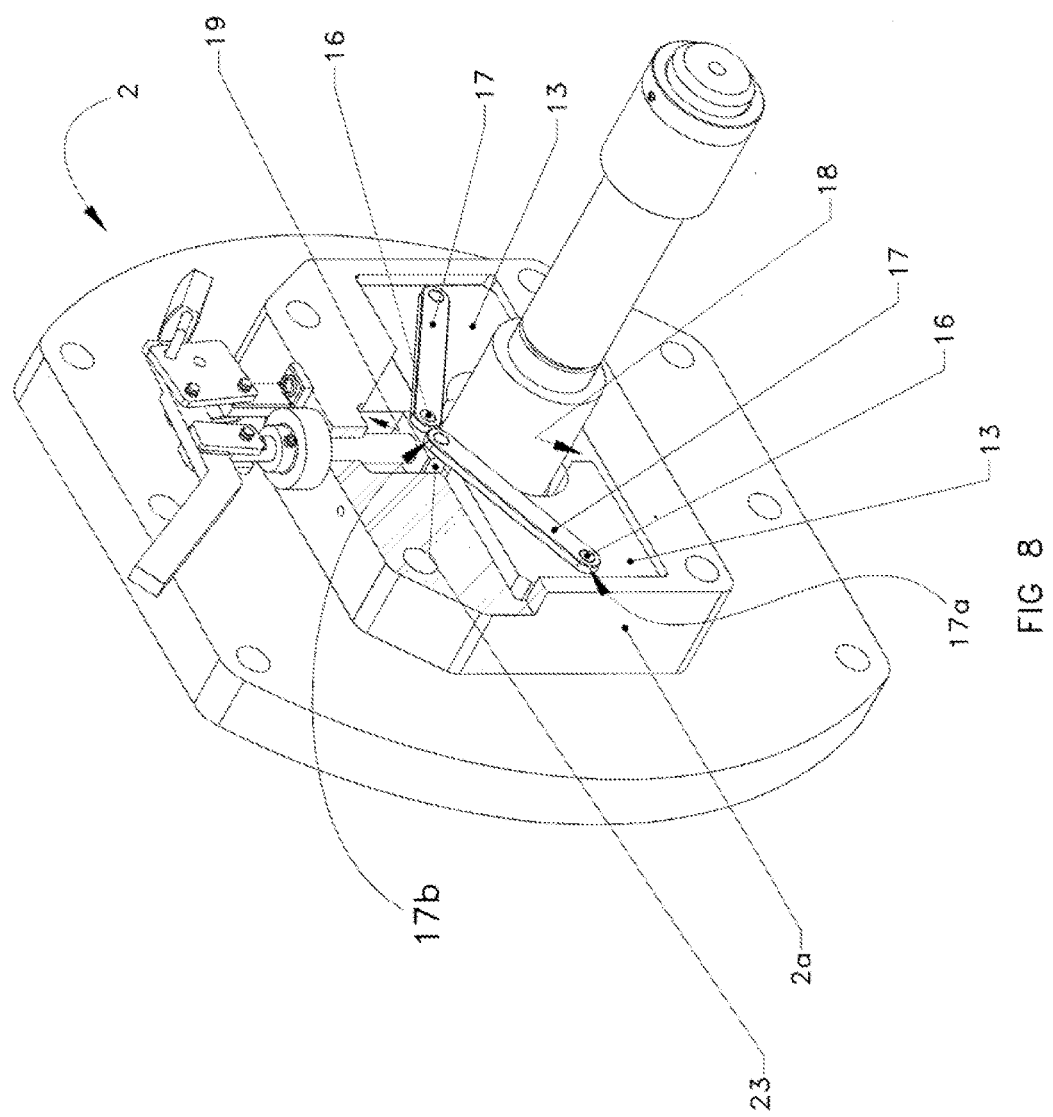
FIG. 8 is the sectional perspective view of an exemplary embodiment of the device with the cover removed, showing the slides and linkages housed inside the device housing and the operating lever linked to the plunger that activates the slides movement.
Figure 12:
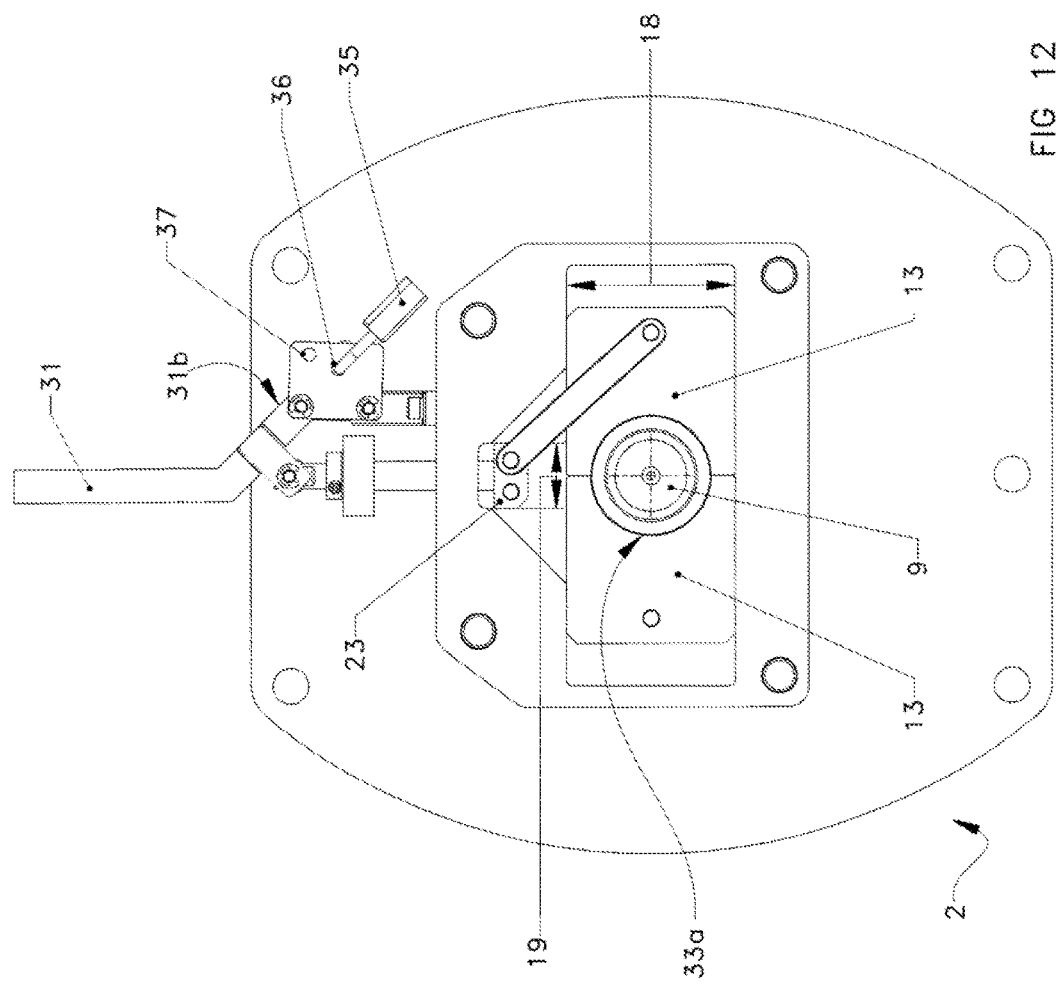
FIG. 12 is the elevation view of an exemplary embodiment of the device without the cover showing the positions of the slides and links within the housing, in its locked position.

Referring to FIG. 7, FIG. 8 and FIG. 12, the slides 13 are housed symmetrically within and guided by planes 18 at the top and bottom in the device housing 2a to enable them to slide in a unilateral manner by links 17 which are hinged to the slides 13 by pins 16 on one extremity 17a and to the plunger head 23 on their other extremity 17b. The plunger head 23 is guided in the device housing 2a and the plunger head 23 is constrained to move only in transverse direction to the slides 13 by the guiding planes 19 of the housing 2a. The slides 13 bear on the recessed face 14 of the device housing 2a (see FIG. 7).

Figure 9:
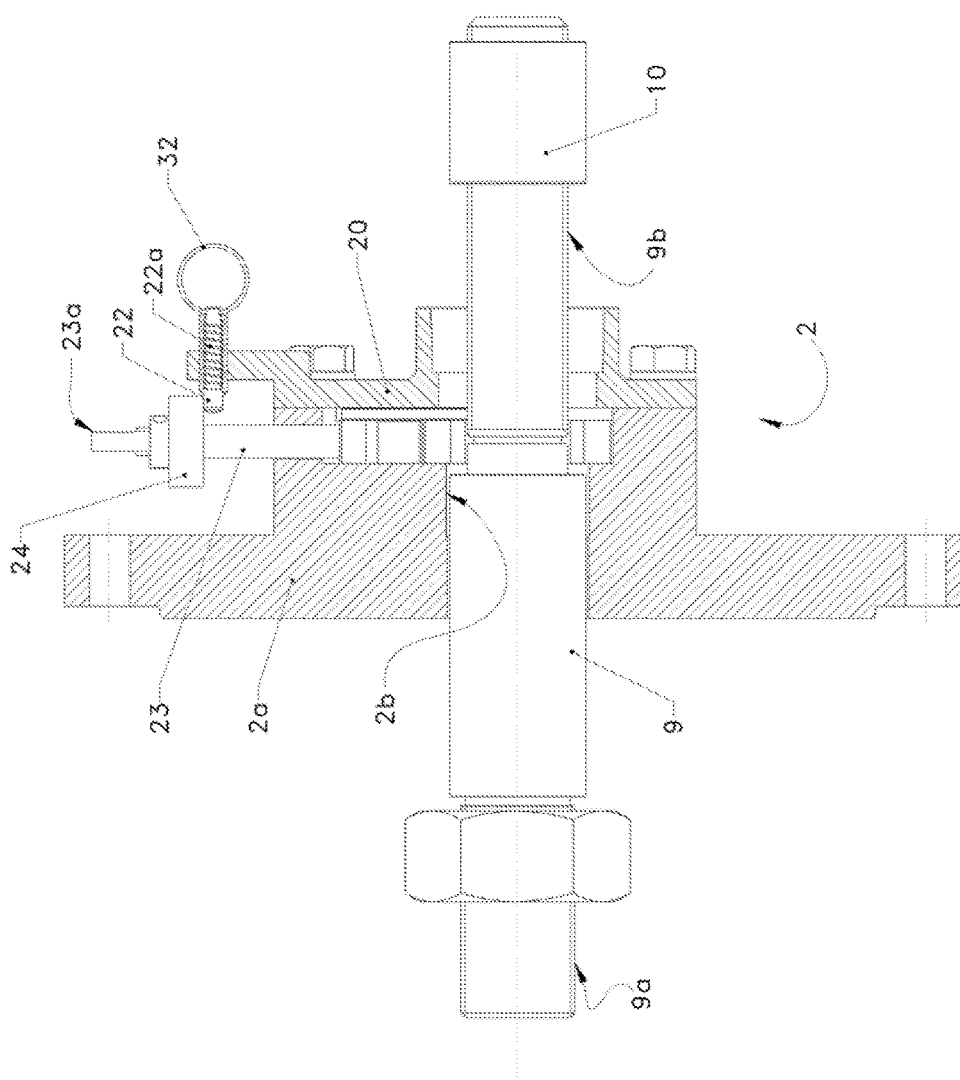
FIG. 9 shows the section view of an exemplary embodiment of the device housing with cover and the spring biased pin retaining the collar nut and thereby the plunger, in its indexed position.
Figure 10:
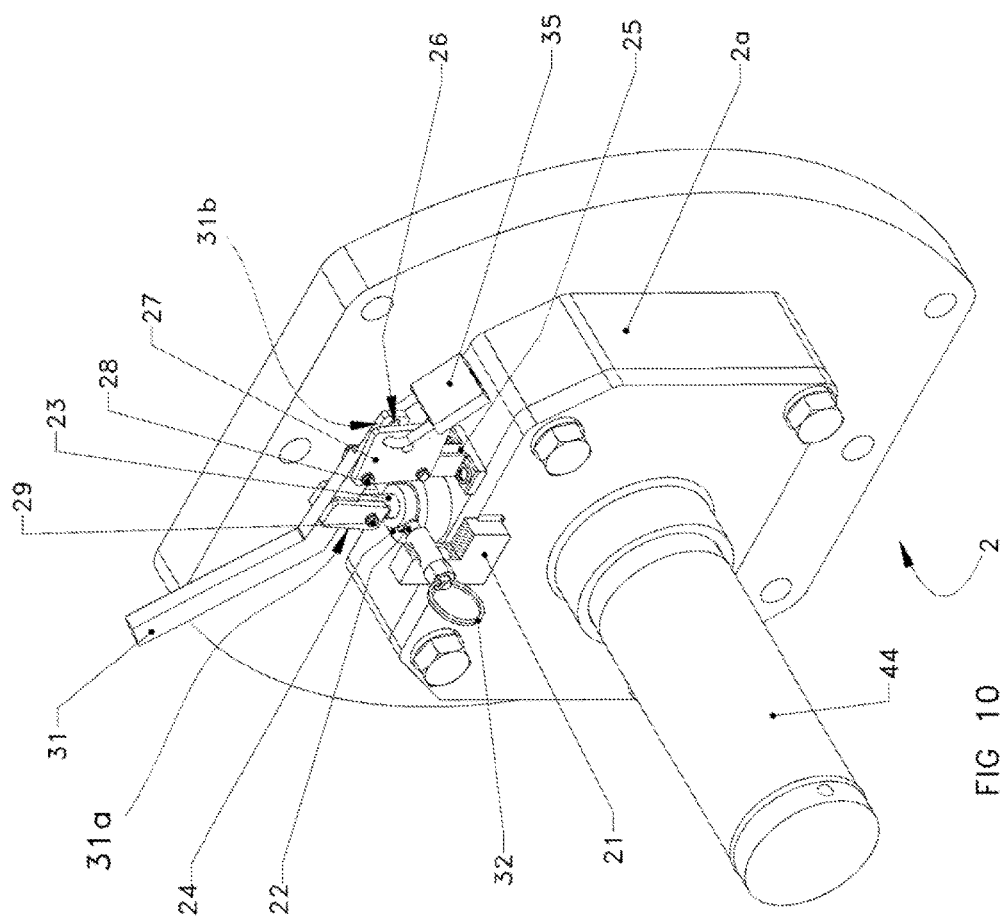
FIG. 10 is the perspective view of an exemplary embodiment of the device with the actuating handle locked with a padlock to prevent inadvertent or unauthorized operation of the device.
Figure 11:
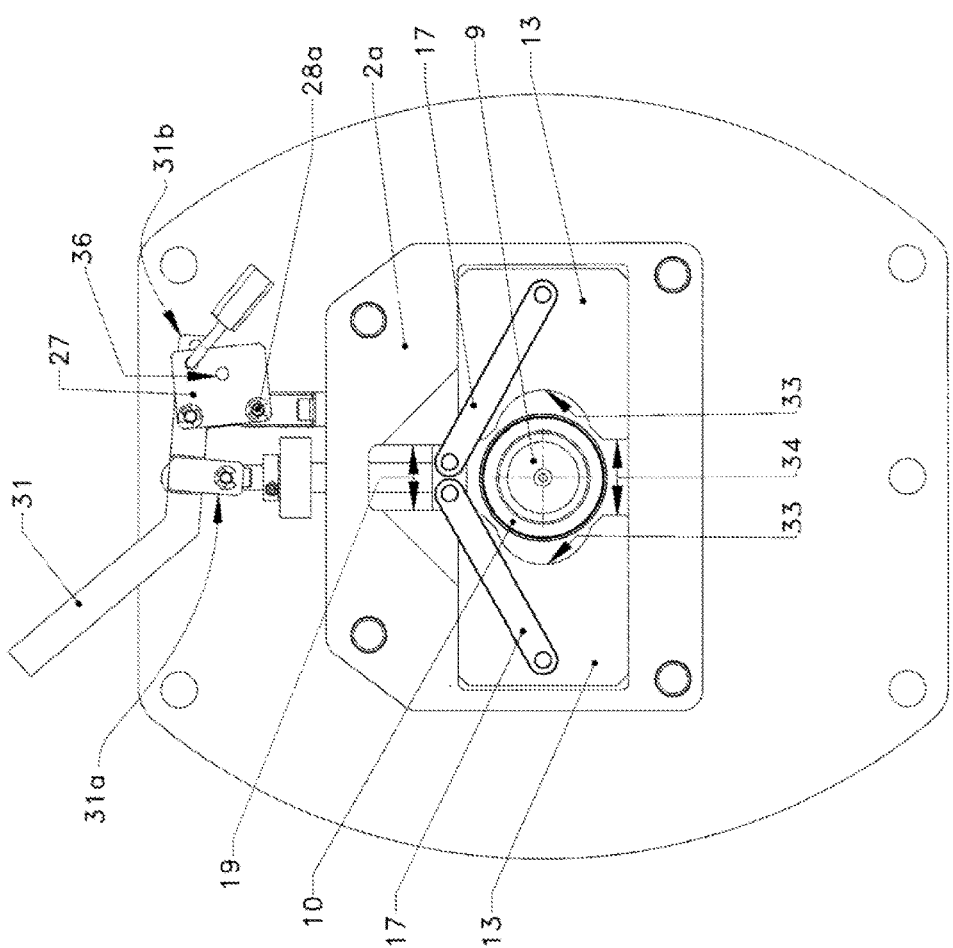
FIG. 11 is the elevation view of an exemplary embodiment of the device without the cover showing the positions of the slides and links within the housing, in its unlocked position.

Referring to FIG. 9, FIG. 10 and FIG. 11, a housing cover 20 retains the internal parts within the housing 2a without hindering their motion. A tubular cover 44 as shown in FIG. 10 protects the extension rod 9. The extending part 23a of the plunger 23 from the housing 2a is threaded to receive an adjustable collar nut 24 which is restrained by a spring biased safety pin or safety device 22 having a spring 22a, thread into an adapted extension 21 of the housing cover 20. The extreme end 23a of the plunger 23 is adapted to receive a pin 29 that engages with the handle 31 forming a hinge 31a (see FIG. 10). The handle 31 is pivoted at its end by a pin 28 on a plate link or link plate 27 which in turn is hinged to a fixity 25 on the housing 2a by a pin 28a.

Releasing the safety pin 22 by pulling on the spring biased pin ring 32 outward to clear the collar nut 24 and actuation of the handle 31 upwards, lifts the plunger 23 which in turn, through the links 17 drives the slides 13 uniformly towards each other until their leading faces or ends 34 bear against each other. In this closed position (see, e.g., FIG. 12), the slides 13 form a planar surface orthogonal to the extension rod's 9 axis and the semi-circular cut-outs 33 on the slides 13 form a hole 33a in the aforementioned closed position.

FIG. 3 and FIG. 7 show the device 2 in its lockout configuration and engaged in the locked position. The actuator 1 is operated to its' end of travel position, so determined by the adjustable travel stops or stop bolts 30 of the actuator 1 and in the direction that it needs to be locked in.

Referring to FIG. 10 and FIG. 11, the handle 31 is moved to its upper extreme position upon releasing the safety pin 22 by pulling on the pin ring 32 to enable the collar nut 24 and the plunger 23 to traverse outward from the housing 2a. Upon actuating the handle 31 to the locked position in FIG. 12, the slides 13 contact each other at their leading faces or ends 34 and close on the stepped down section 9b of the extension rod 9 with the semi-circular cut-outs 33 forming a hole 33a encompassing the extension rod's section 9b between the step face 6 and the thimble nut's inner face 7. The slides 13 disposed in the device housing 2a when engaged with the extension rod 9 (or, more specifically, the stepped down section 9b) may provide a means for restraining the movement of the extension rod 9. Releasing the pin ring 32 returns the safety pin 22 to below the collar 24 and retains the plunger 23 and the handle 31 in this locked position.

Referring again to FIG. 6 and FIG. 7, the thimble nut 10 is now so adjusted to let the inner face 7 of the thimble nut 10 just about to bear on the slides' 13 front faces 15. A set screw 11 locks the thimble nut's 10 position on the extension rod 9.

Application of pressure to the actuator's 1 cylinder in the said locked position results in the thimble nut 10 loading on the slides' 13 faces 15 and thereby prevents the extension rod 9, the guide block 8 and in turn the yoke 3 from moving. The actuator 1 is thus locked out in this position. To unlock, the handle 31 is shifted to an extreme down position which translates the slides 13 through the links 17 to retract the slides 13 to their end positions within the housing 2a, wherein the slides 13 are retracted away from linear motion member 12, clearing the thimble nut 10 and the extension rod 9 completely, thereby posing no impedance to the motion of the extension rod 9.

Referring to FIG. 10, FIG. 11 and FIG. 12, a plate link 27 having two holes 36 and 37 that line up with the slot 26 in the extension 31b of the handle 31, provide a means of locking the handle 31 against unauthorized operation, in its two said positions by engaging a padlock 35 through the aligned holes 36 or 37.

In the exemplary device's 2 other configuration as a partial stroke valve testing device, the actuator 1 is operated to its' end of travel position, so determined by the adjustable travel stops 30 of the actuator 1 and to the position that it requires to be tested in for the partial stroke test.

Figure 13:
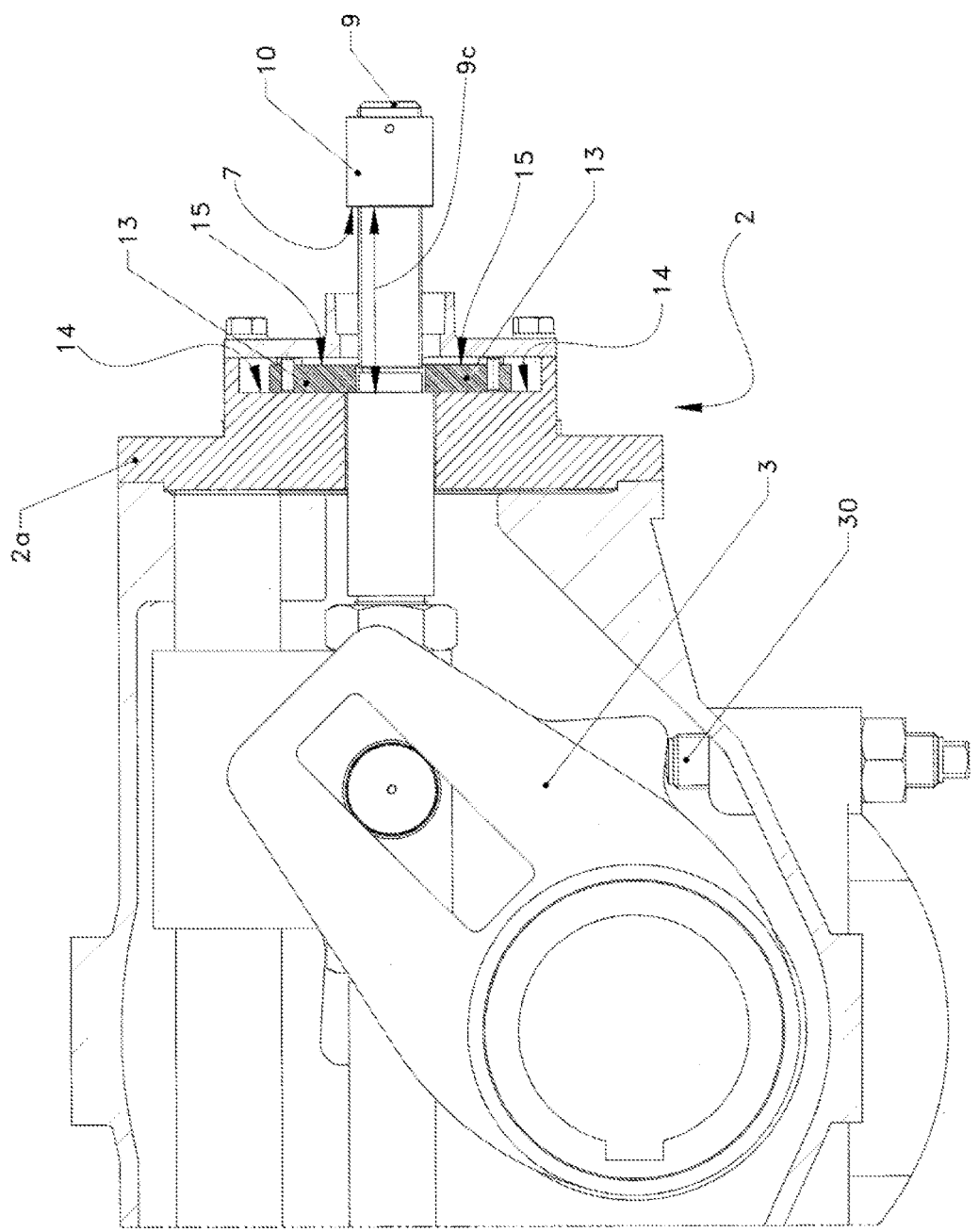
FIG. 13 is the section view of an exemplary embodiment of the device set to partial stroke valve testing mode by the positioning of the thimble nut and engaging of the slides to permit a predetermined linear movement of the extension rod.

Referring to FIG. 12 and FIG. 13, the handle 31 is operated upward to engage the device 2 into testing mode. The thimble nut 10 on the extension rod 9 is loosened and so adjusted that there is a gap 9c formed between the slides' 13 outer faces 15 and the inner face 7 of the thimble nut 10. The width of this gap 9c determines the extent of the partial stroke. The partial stroke adjustment allows, by way of example only, twenty to thirty (20 to 30) degrees of rotation of the actuator's 1 output drive member 3.

In the test mode, application of pressure to the actuator's 1 cylinder to operate the actuator 1 counter to the said travel end position, results in the piston rod 4, the extension rod 9 and thus the thimble nut 10 to move towards the slide faces 15, to the extent of the said gap 9c between the slides 13 and the thimble nut face 7. The thimble nut face 7 now comes in contact with the slide face 15 and thereby mechanically prevents the extension rod 9 and in turn the drive member 3 from moving any further. The actuator 1 has now performed a partial stroke. To restore operation mode, the handle 31 is shifted to extreme down position which translates the slides 13 through the links 17 to retract the slides 13 to their end positions within the housing 2a, wherein the slides 13 are retracted away from the linear motion member 12, clearing the thimble nut 10 and the extension rod 9 completely, thereby posing no impedance to the motion of the extension rod 9.

Referring to FIG. 10, FIG. 11 and FIG. 12, a plate link 27 having two holes 36 and 37 that line up with the slot 26 in the extension 31b of the handle 31, provide a means of locking the handle 31 against unauthorized operation, in its two said positions by engaging a padlock 35 through the aligned holes 36 or 37.

Figure 14:
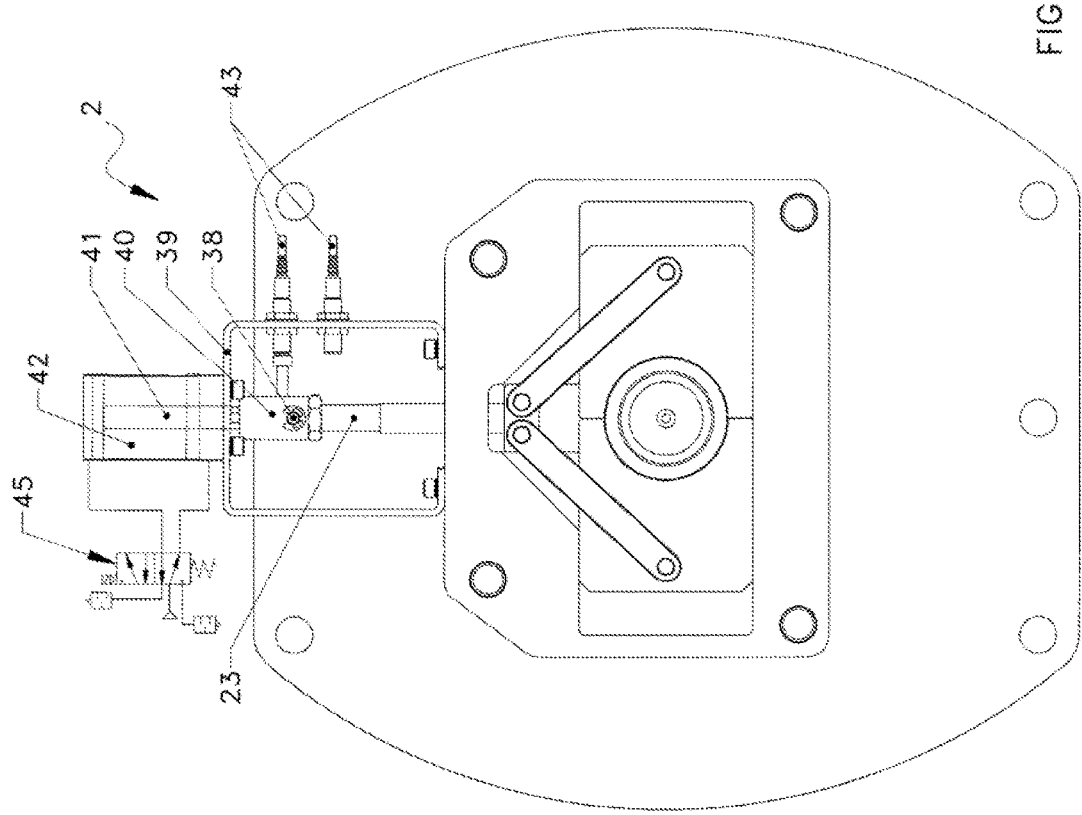
FIG. 14 shows an exemplary embodiment of the adaptation of the device to remote operation, by replacement of the handle operating mechanism with a short stroke pneumatic cylinder operated by a solenoid valve.

FIG. 14 shows an alternative exemplary embodiment of the device 2 with optional remote actuation, wherein the manual actuation handle 31 and associated parts are replaced by a pneumatic cylinder 42. In this exemplary embodiment, a pneumatic cylinder 42 is mounted on a bracket 39 that aligns the cylinder 42 coaxially with the plunger 23 and the piston rod 41 of the pneumatic cylinder 42 is coupled to the plunger 23 with a coupler 40 and pin 38. The pneumatic cylinder 42 is operated by a solenoid valve 45, the power to which is controlled remotely from the central control unit (not illustrated). This arrangement allows the partial stroke valve test to be performed remotely once the device 2 has been configured for the purpose. Sensors 43 on the bracket 39 provide a feedback signal to the central control unit for the confirmation of the actuation position, and to further engage or disengage the test mode.

Figure 15A:
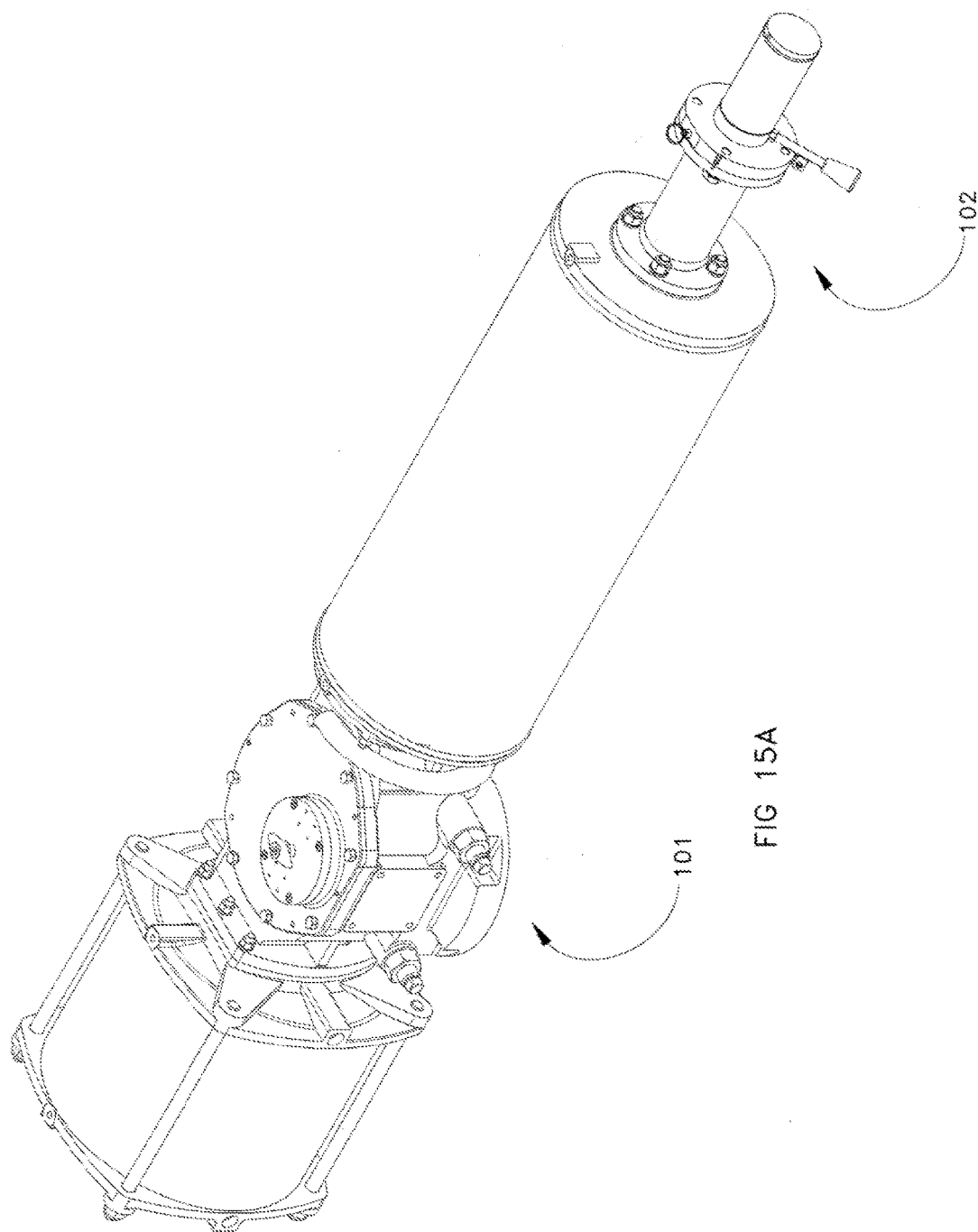
FIG. 15A shows a perspective view of a valve spring return actuator fitted with another exemplary combination device.
Figure 15C:
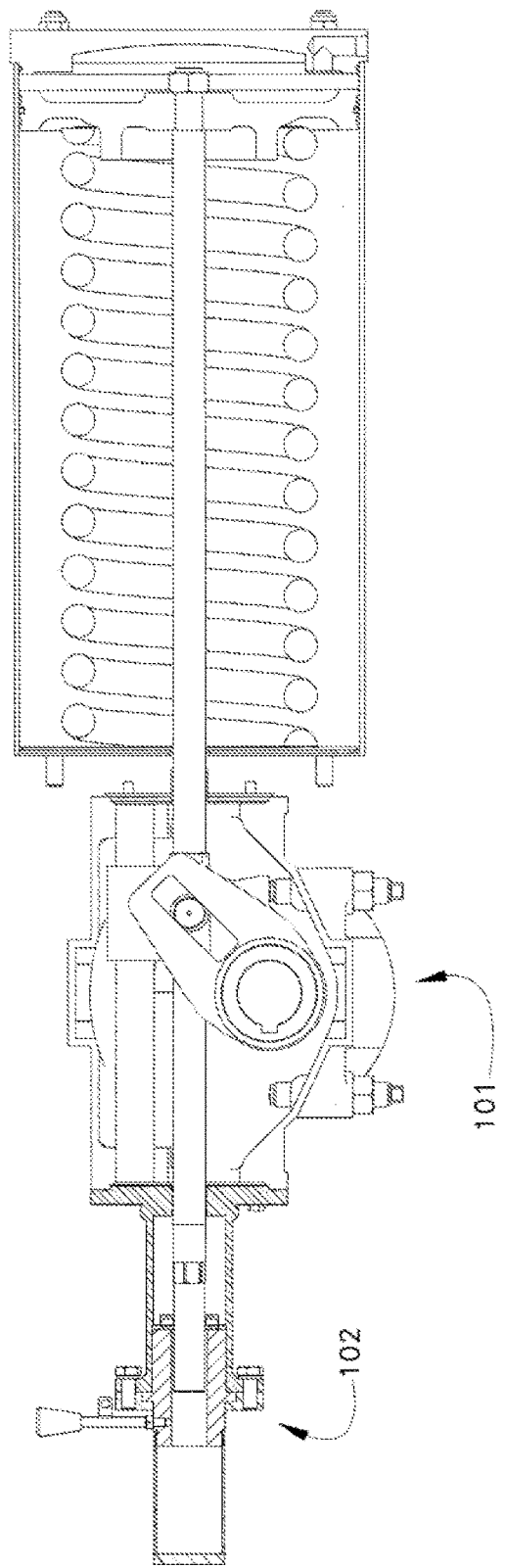
FIG. 15C shows a section view of a valve actuator fitted with an exemplary combination device.

A scotch yoke type of actuator 101 (e.g., such as a fluid powered cylinder actuator) on which another exemplary embodiment of a lockout and partial stroke test combination device 102, in accordance with the present disclosure, may be fitted is depicted in FIGS. 15A through 15C. The exemplary actuator 101 is used for turning the flow control member of a quarter turn valve (not shown). The actuator 101 depicted here converts the linear motion of the piston 105 on application of fluid pressure on either side of the piston 105 to rotary motion of the actuator's 101 output drive member or drive element, namely yoke 103, by the scotch yoke mechanism of this exemplary actuator 101. It may be understood that the actuator 101 could be of rack and pinion style or a diaphragm style and so forth. It must also be understood that a lockout and partial stroke test combination device 102 in accordance with this disclosure may be used in combination with other cylinder actuator designs than those described herein, for example, on a linear valve actuator (not shown) and may also be used in combination with cylinder actuators (not shown) that are not employed for controlling the flow control member of a valve.

Figure 16A:
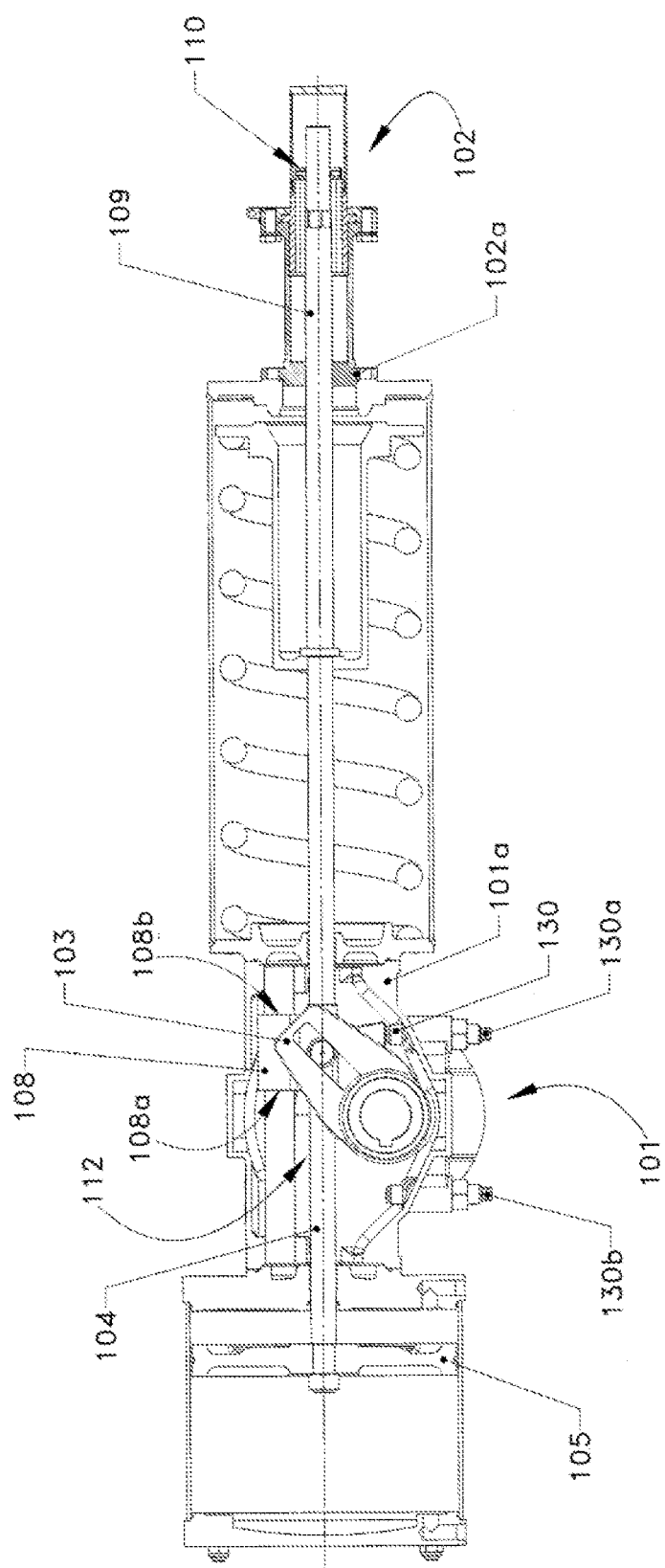
FIG. 16A shows a section view of an exemplary embodiment of the combination device mounted on a valve actuator at one end of the actuator's travel, configured as a lockout device in unlocked position.
Figure 16B:
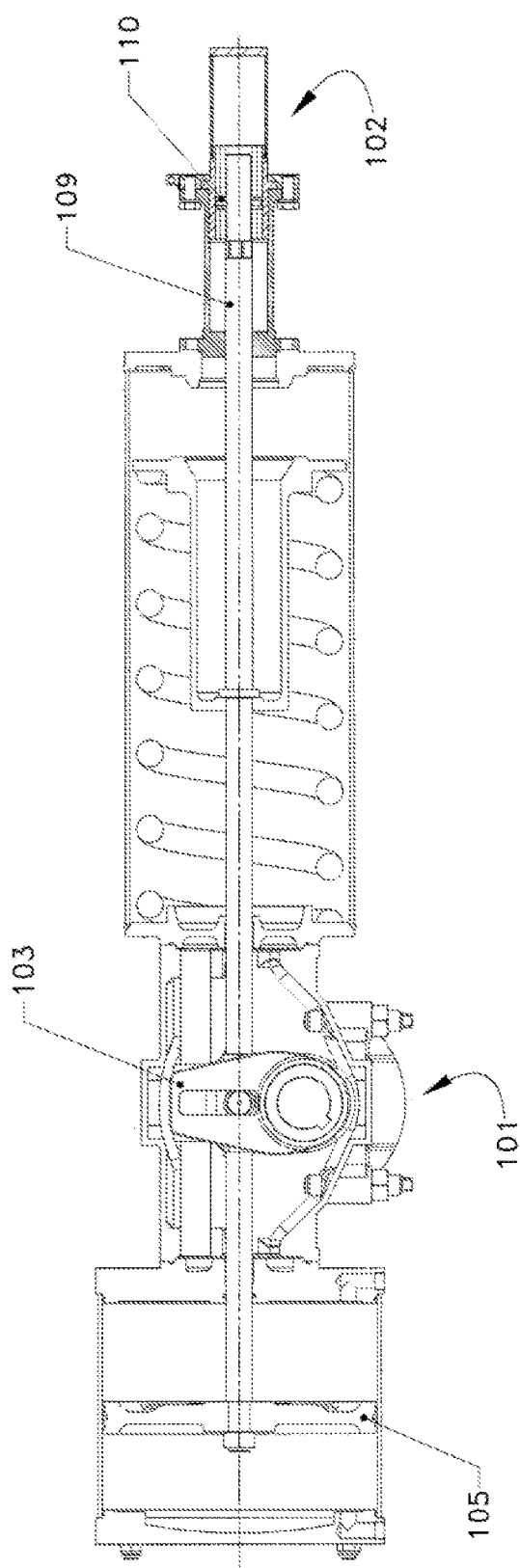
FIG. 16B shows a section view of an exemplary embodiment of the combination device mounted on a valve actuator at mid position of actuator's travel, configured as a lockout device in unlocked position.
Figure 16C:
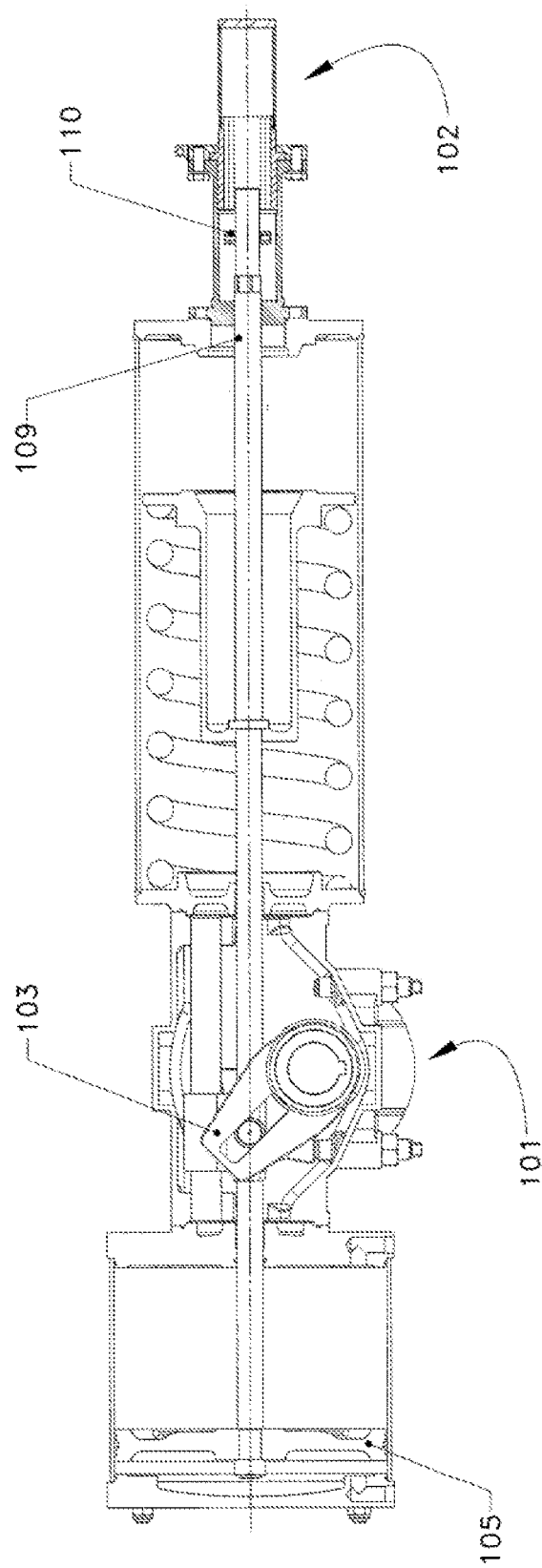
FIG. 16C shows a section view of an exemplary embodiment of the combination device mounted on a valve actuator at the other end of actuator's travel, configured as a lockout device in unlocked position.
Figure 16D:
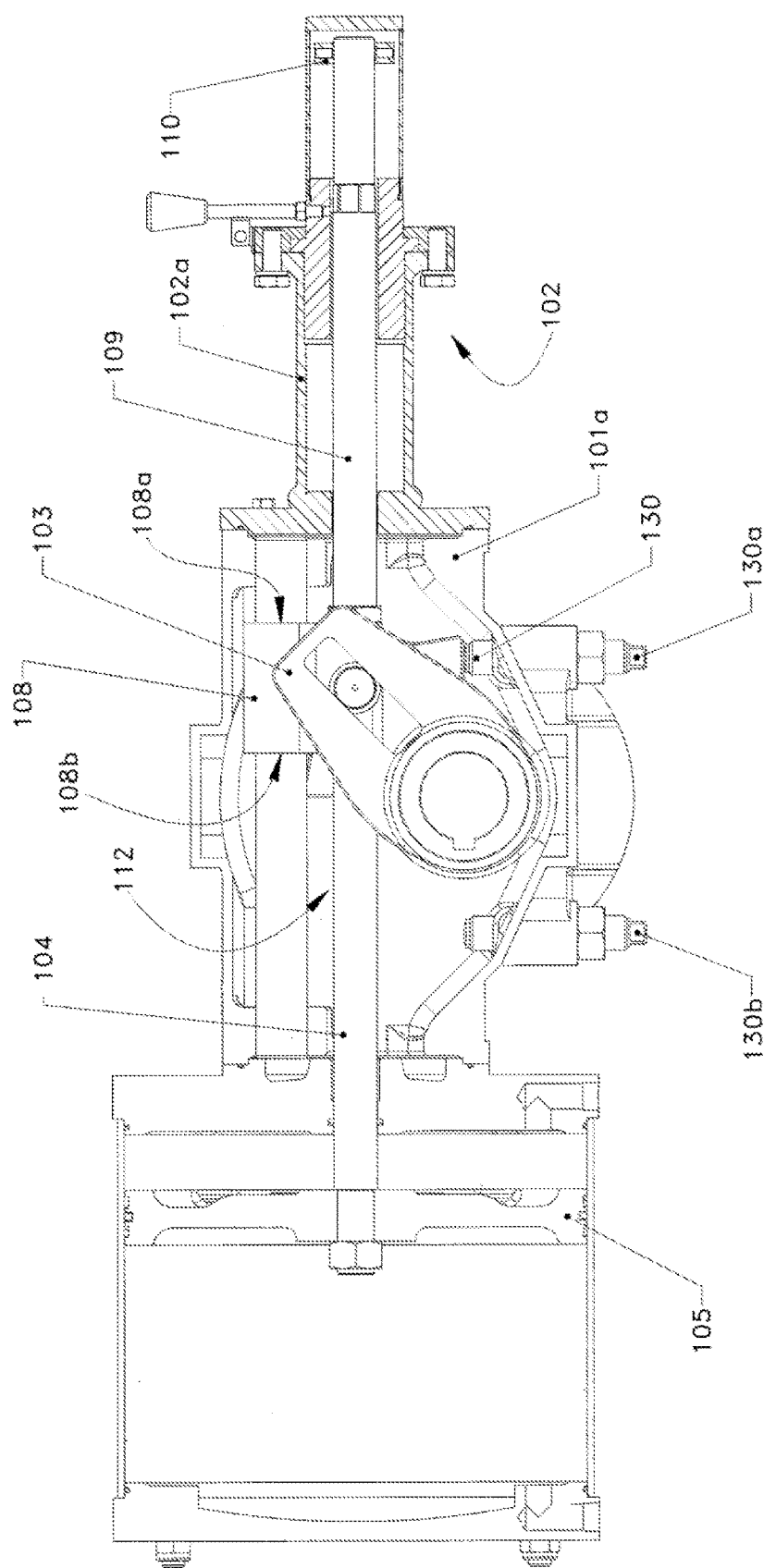
FIG. 16D shows a section view of an exemplary embodiment of the combination device mounted on a variant configuration of a valve actuator at one end of its travel, configured as a partial stroke test device in engaged position.

FIG. 16A and FIG. 16D show the device housing 102*a* integrated with the adaptation to (or adapted to) mount on the actuator housing 101*a* to receive and align the device 102 to the axis of the linear motion member 112 of the actuator 101, namely the cylinder piston rod 104. The extension rod 109 also forms the linear motion member 112, coaxial to the piston rod 104, coupled to the guide block 108 of the actuator 101 by threading and in the operation mode, the extension rod 109 freely passes through the index sleeve's 106 double D profiled bore 106*e*, unhindered throughout the entire stroke of the actuator's 101 guide block 108.

Relating to construction and operation generally and referring to FIG. 16A, FIG. 16B, FIG. 16C and FIG. 16D, the actuator is seen progressively from its clockwise end position to mid travel position and to its counter clockwise end position with the rotary motion of the yoke 103 limited by the actuator's 101 integral and adjustable travel stops or stroke stop bolts 130 in the actuator housing 101*a*. The extension rod 109 is threaded at one end 109*a* which engages and locks into female threads on one side 108*a* of the actuator's 101 guide block 108; the guide block 108 is also fixedly connected to the piston rod 104 on the other side 108*b* of the guide block 108, integrating the extension rod 109 coaxially with the pneumatic cylinder's piston rod 104. The other end 109*b* of the extension rod 109 is threaded to receive a double D profiled adjustable stop nut or fastener 110 on the extension rod 109 for the partial stroke adjustment and positioning. The adjustable stop nut 110 too is of a double D profile but is of slightly smaller dimensions than the profiled bore 106*e* in the index sleeve 106, permitting the adjustable stop nut 110 to slide through the index sleeve bore 106*e*.

Figure 17C:
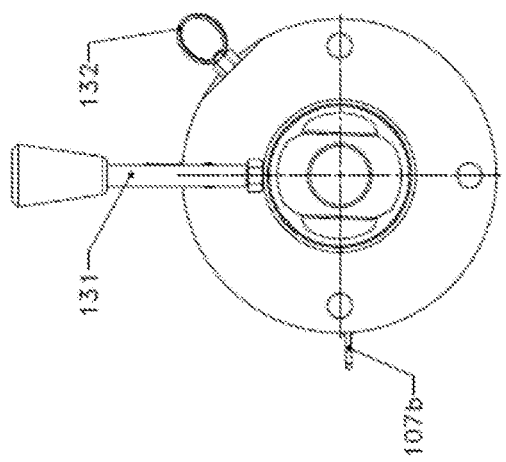
FIG. 17C is the part section side view of an exemplary embodiment of the combination device showing the indexed position locking by the spring biased plunger pin, in disengaged position of the device. The view also shows the adjustable stop nut profile in alignment with respect to the index sleeve's profiled bore.
Figure 19A:
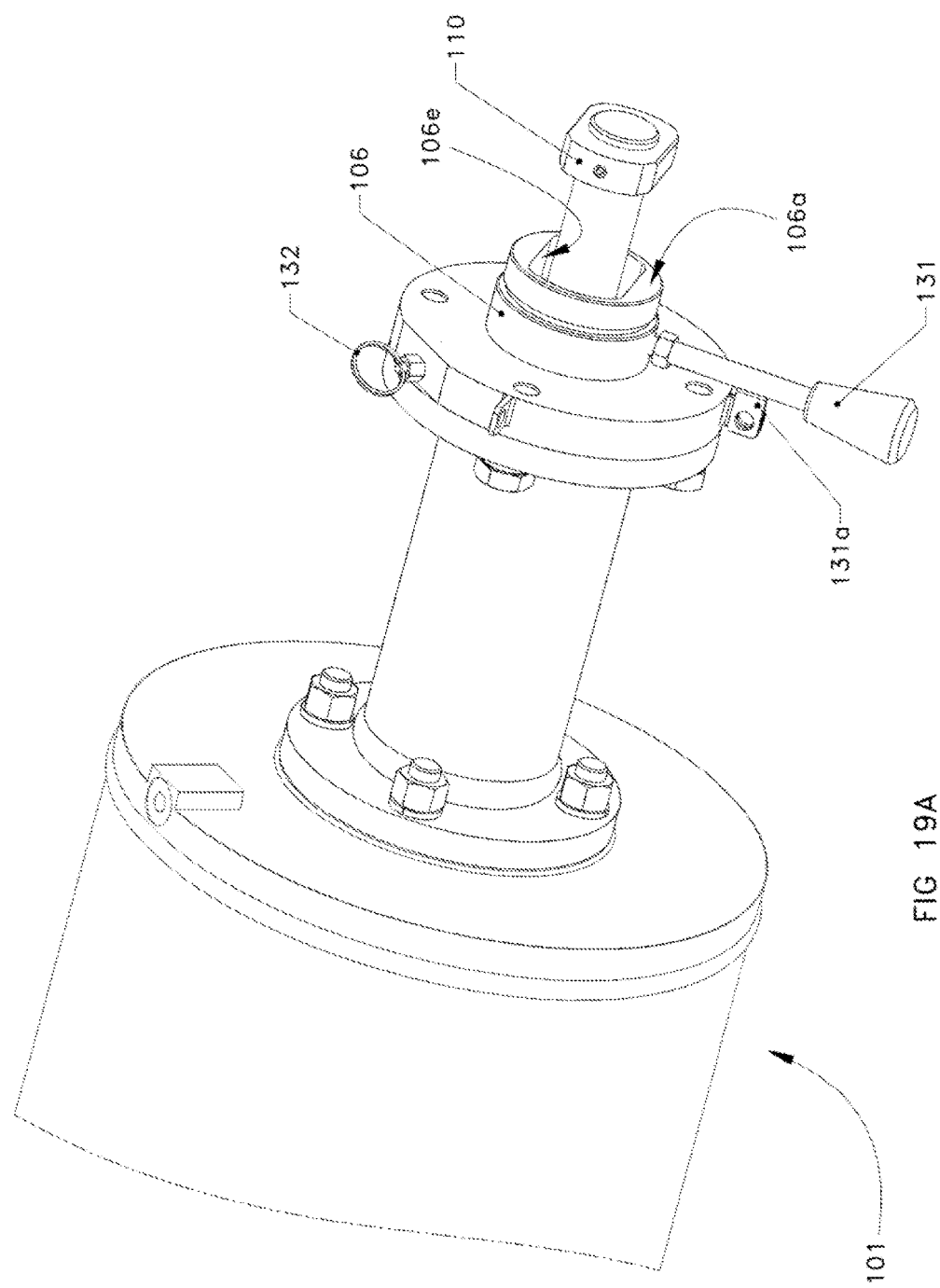
FIG. 19A is the perspective view of an exemplary embodiment of the combination device mounted on a valve actuator, configured as a partial stroke test device in disengaged position at one end of the actuator's travel position.
Figure 19C:
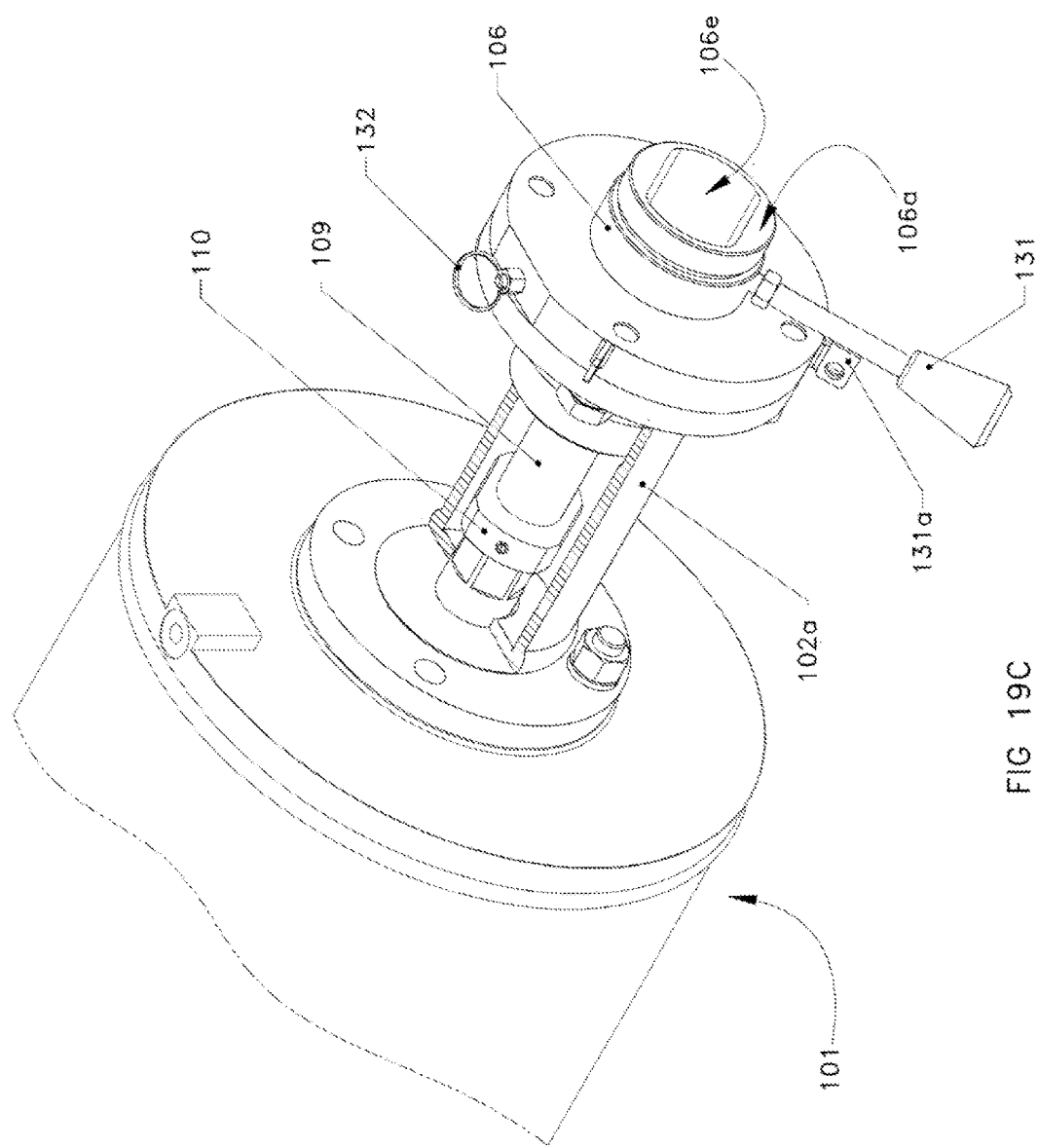
FIG. 19C is the perspective partial sectioned view of an exemplary embodiment of the combination device mounted on a valve actuator, configured as a partial stroke test device in disengaged position at the other end of the actuator's travel position.
Figure 19D:
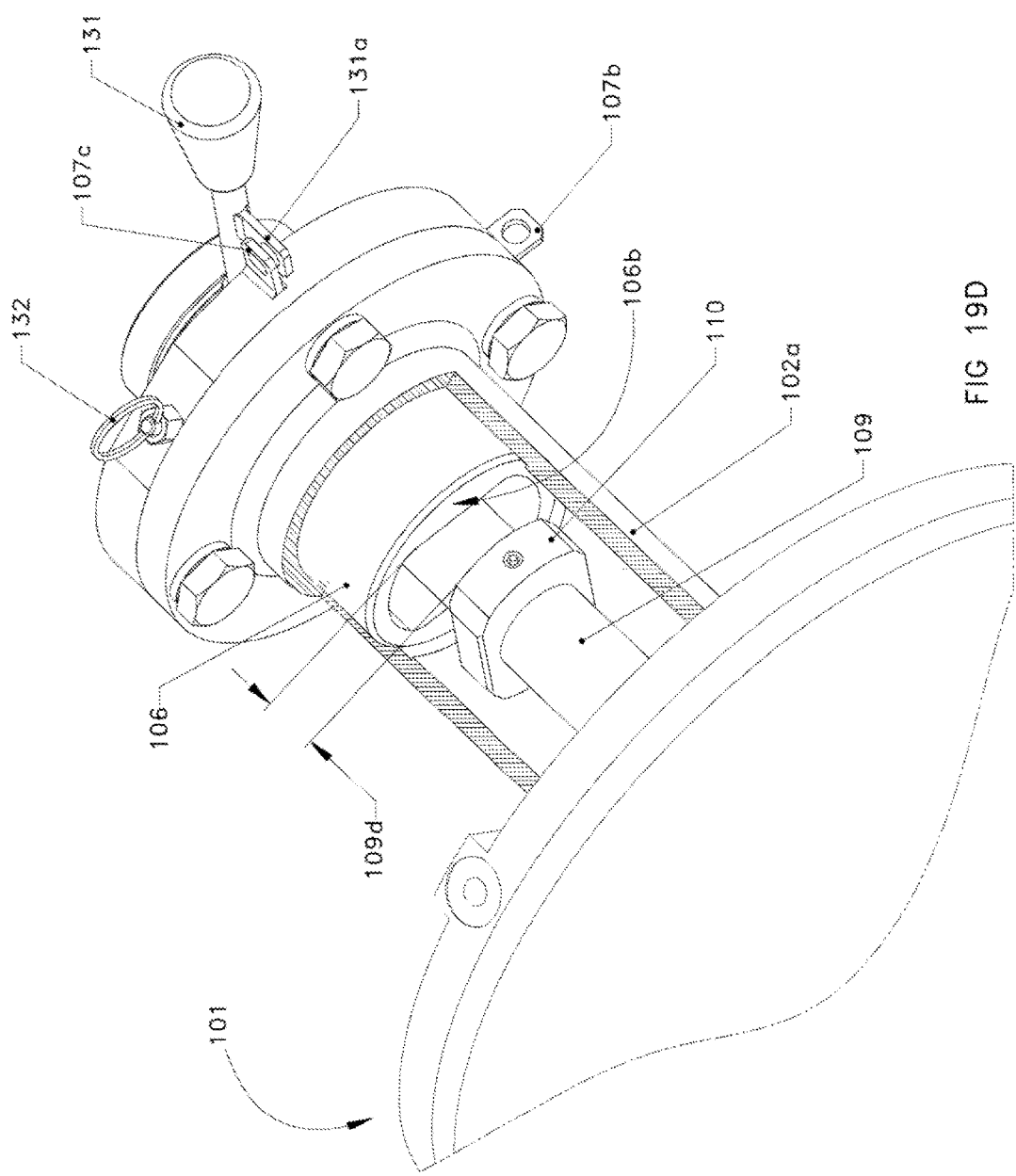
FIG. 19D is the perspective partial sectioned view of an exemplary embodiment of the combination device mounted on a valve actuator, configured as a partial stroke test device showing the set partial stroke.
Figure 19E:
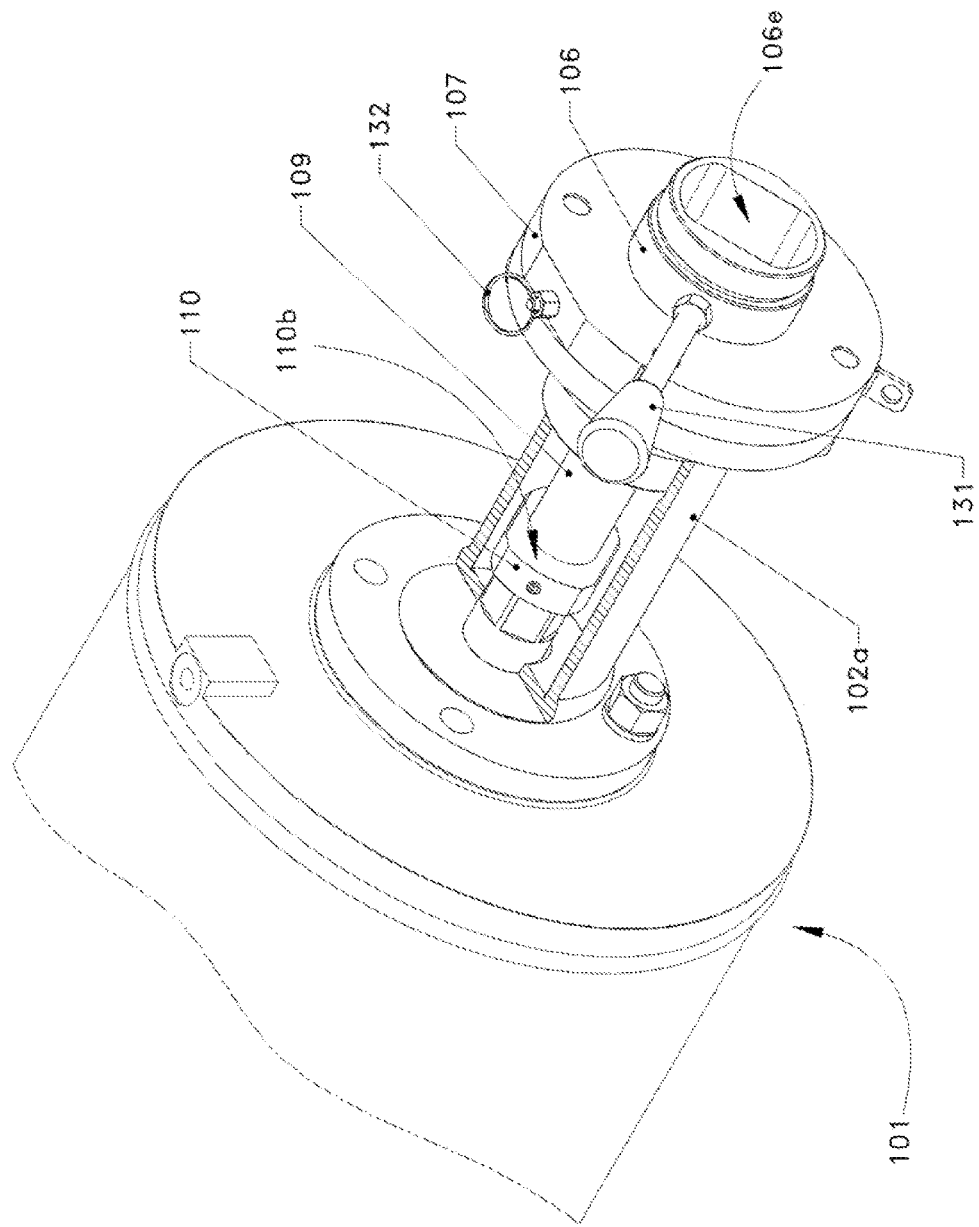
FIG. 19E is the perspective partial sectioned view of an exemplary embodiment of the combination device mounted on a valve actuator, configured as a partial stroke test device in the engaged position at the other end of the actuator's travel position.
Figure 20:
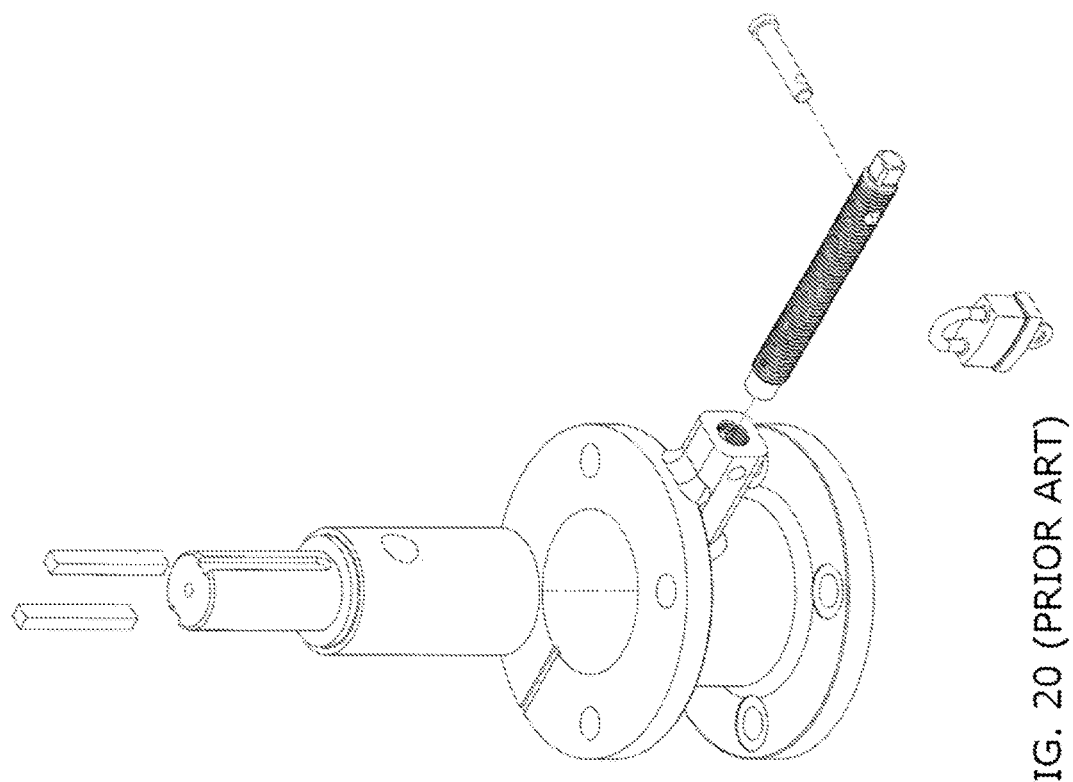
FIG. 20 shows an exploded perspective view of a prior art coupling of an actuator and a rotary valve.
Figure 21:
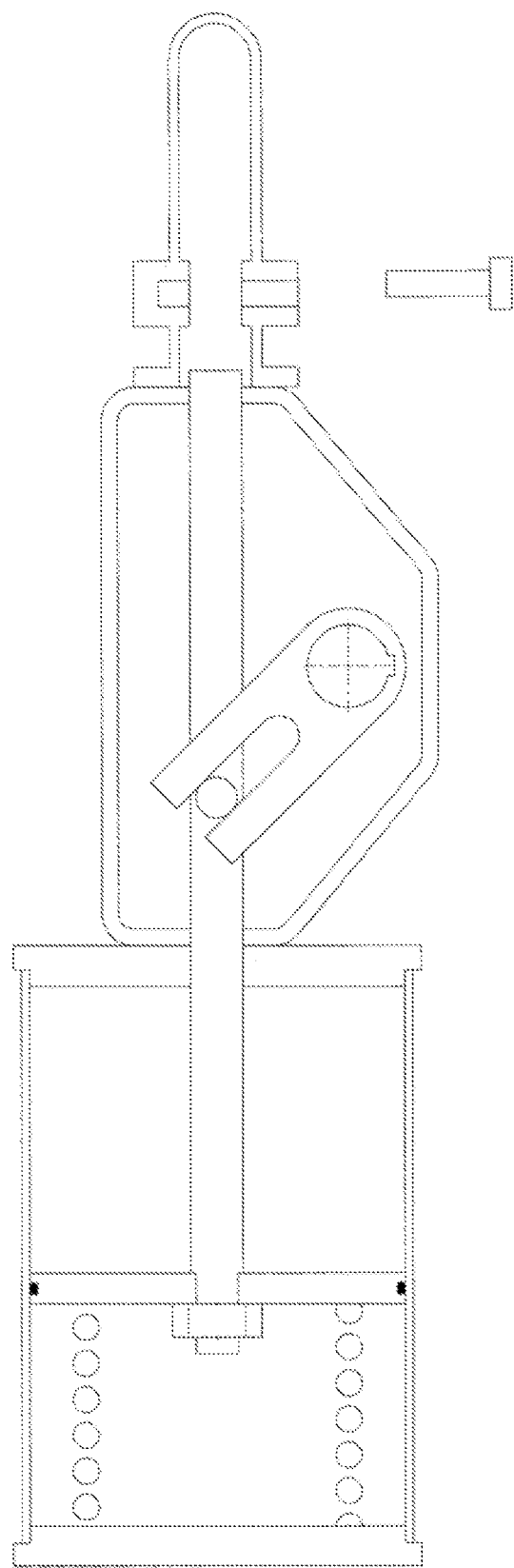
FIG. 21 shows a prior art partial stroke valve test device.
Figure 22:
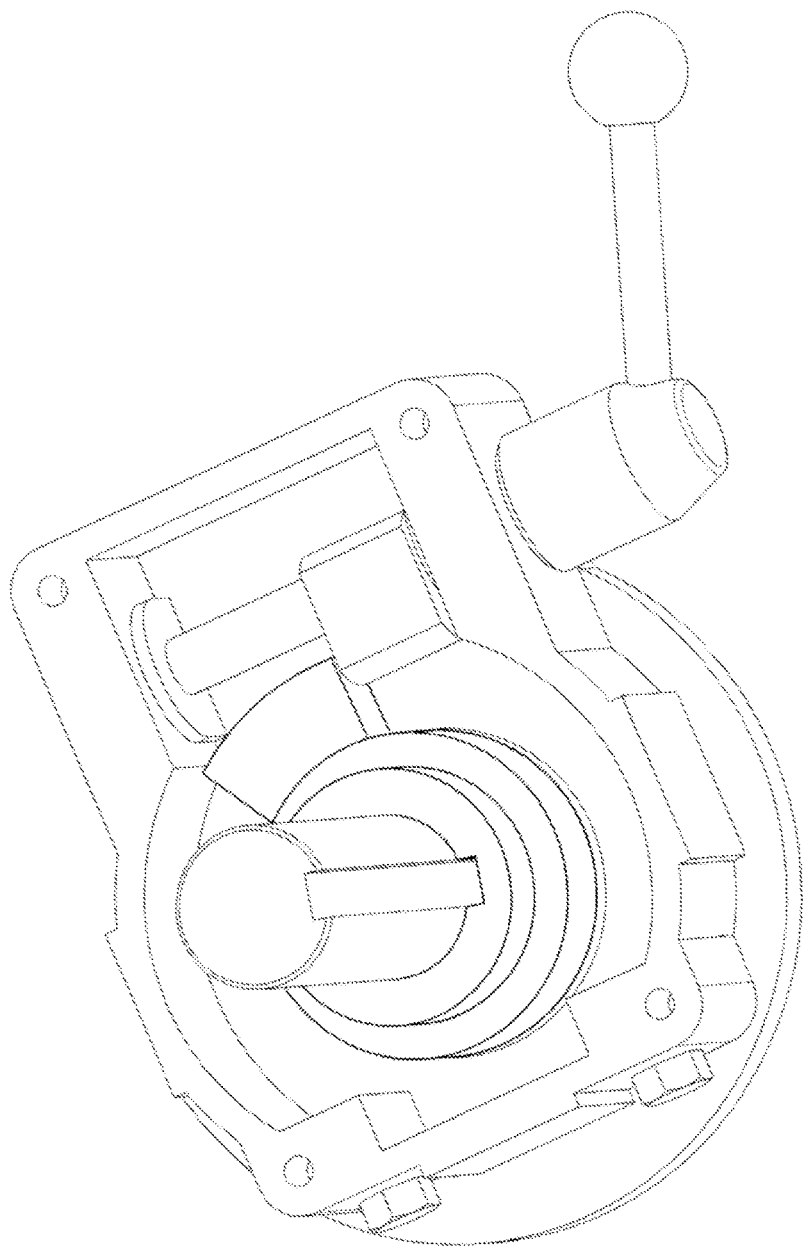
FIG. 22 shows a perspective view of a prior art partial stroke valve test device.

In the operation mode, as seen in FIG. 17A, FIG. 17C and FIG. 19A, the stroke restraining member of the device, namely the index sleeve 106, is in its extreme counter clockwise position so determined by the spring biased indexing pin 122 locating into the slot 106*j* on the index sleeve's 106 flange 106*f*. In this said position, the adjustment nut 110 is so set and locked on the extension rod's 109 threads 109*b* by a set screws 111 that its double D profile aligns with the index sleeve's 106 double D profiled bore 106*e* thereby the motion of the extension rod 109 and the adjustment nut 110 through the index sleeve 106 it is not impeded.

Figure 17B:
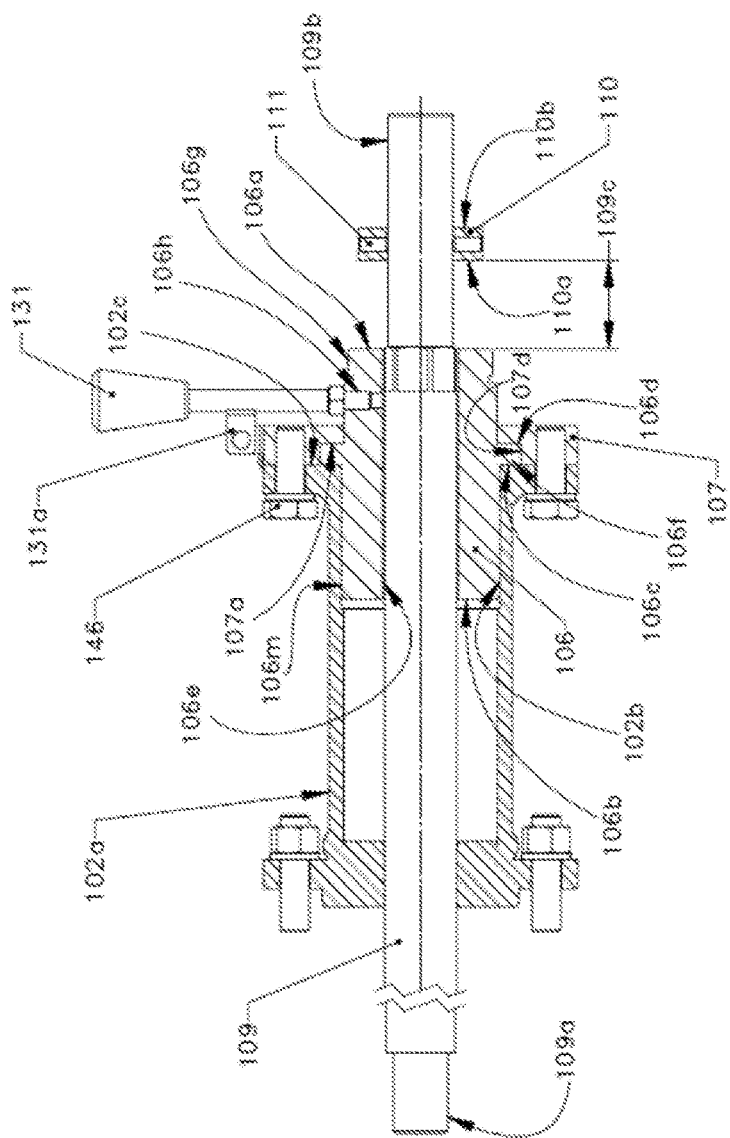
FIG. 17B is the section view of an exemplary embodiment of the combination device, configured as a valve partial stroke testing device in engaged or test position.

Referring to FIG. 17A and FIG. 17B, the index sleeve 106 is located coaxially within the housing 102*a* by sliding fit of the locating diameter or outer diameter or circumference 106*m* of the index sleeve 106 into the housing bore 102*b* of the housing 102*a*. The inner face 106*c* of the index sleeve flange 106*f* bears on the housing's 102*a* rear flange face 102*c*. The housing cover 107 envelopes the index sleeve flange 106*f*, with the inner recessed face 107*a* of the recessed or counter bore 107*d* of the cover 107 bearing on the index sleeve flange's 106*f* outer face 106*d* and the cover 107 is bolted on to the housing's 102*a* rear flange by bolts 146. The index sleeve is thus free to only rotate within the housing 102*a* and the housing cover 107 but constrained from axial movement by the housing end flange face 102*c* and the housing cover's 107 inside recessed face 107*a* of the recessed or counter bore 107*d*, which bear on the two faces of the index sleeve flange's 106*f* faces 106*c* and 106*d*, respectively.

Referring to FIG. 17A, FIG. 17B and FIG. 17C, a housing cover 107 retains the index sleeve 106 within the housing 102*a* without hindering the index sleeve's 106 rotary motion within the housing 102*a*. A tubular cover 144 as shown in FIG. 16E is threaded on the index sleeve's threaded end 106*g* to protect the extension rod 109 and the adjustable stop nut 110. A spring biased indexing pin 122 having a spring 122*a* is thread radially into the housing cover 107 and the pin locates into the radial slot 106*j* when the device is disengaged and into the slot 106*k* when the index sleeve 106 is turned clockwise to engage the device. The index sleeve 106 has a threaded hole 106*h* that receives the handle 131 that is threaded on its one end and is locked on to the index sleeve 106 by a lock nut 147.

Figure 17D:
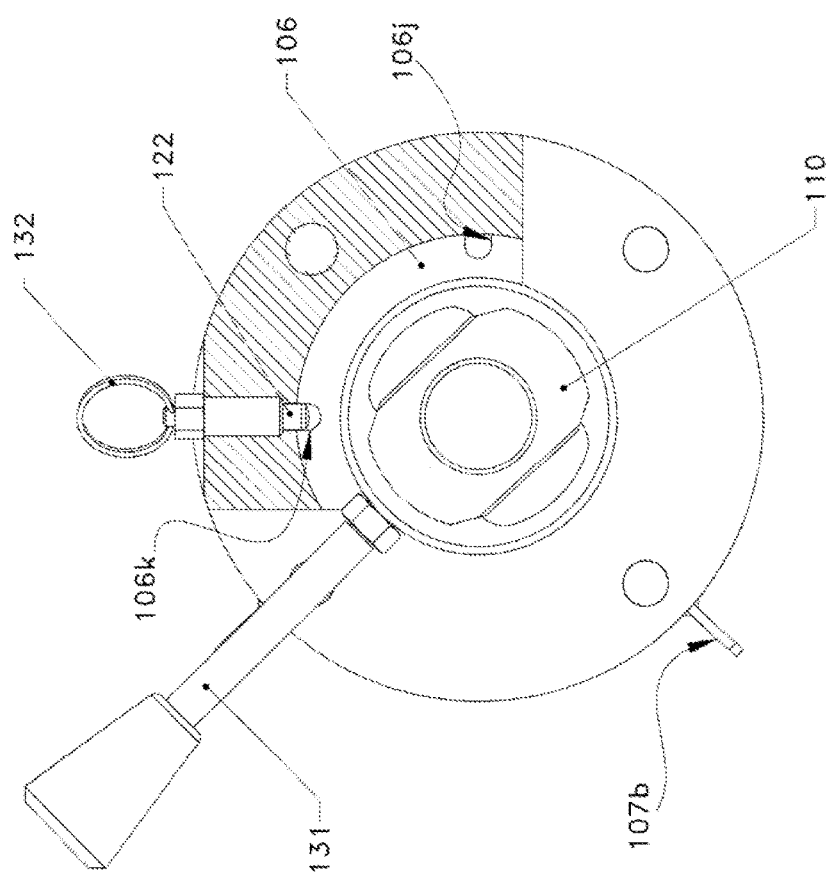
FIG. 17D is the part section side view of an exemplary embodiment of the combination device showing the other indexed position locking by the spring biased plunger pin, in engaged or test position of the device. The view also shows the adjustable stop nut profile counter posed with respect to the index sleeve's profiled bore.

Referring FIG. 17C and FIG. 17D, releasing the spring biased safety pin or safety device 122 by pulling on the pin ring 132 outward to clear the slot 106*j* and actuation of the hand lever 131 upwards, turns the index sleeve 106 clockwise. On release of the spring biased indexing pin ring 132 while rotating the index sleeve 106 clockwise by the handle 131, the pin locates into the radial slot 106*k* on the index sleeve's flange 106*f* and locks the index sleeve 106 in the device's thus engaged position. In this engaged position (see FIG. 17D and FIG. 19B), the outer face 106*a* of the index sleeve 106 forms a planar surface orthogonal to the extension rod's 109 axis and is in direct path of the adjustable stop nut's 110 translatory motion. Accordingly, a means of restraining movement of the extension rod 109 may include: the index sleeve 106 with the double D profiled bore 106*e*, the index sleeve flange 106*f* with two indexing slots 106*j* and 106*k* machined radially 90 degrees apart, and the index sleeve 106 disposed in the device housing 102*a* that when the position of the index sleeve 106 is rotated by 90 degrees (or otherwise unaligned with the profile of the adjustable stop nut) provides a means of restraining the movement of the extension rod 109 and the adjustable stop nut 110 on the free or second end of the extension rod 109.

Figure 18A:
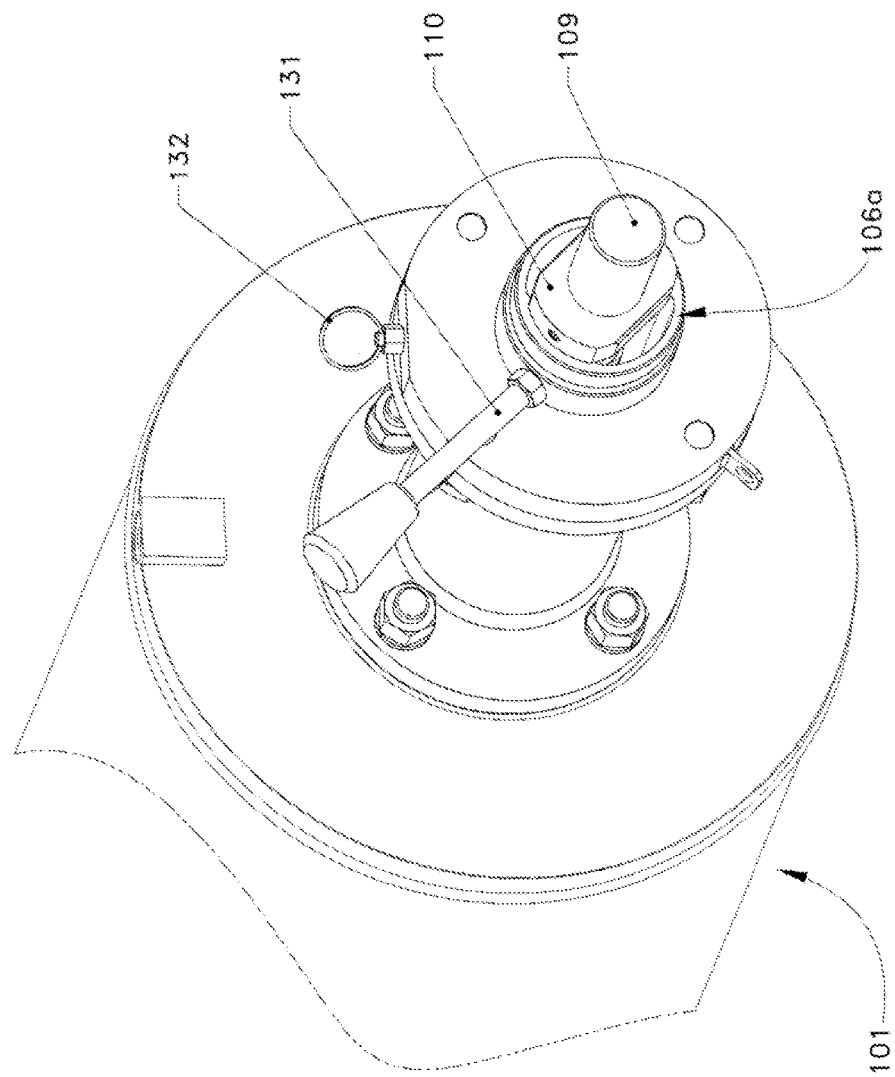
FIG. 18A is the perspective view of an exemplary embodiment of the combination device mounted on a valve actuator, configured as a lockout device in an engaged position at one end of the actuator's end position.

Relating to the locking device configuration generally, FIG. 16D and FIG. 18A show the device 102 in its lockout configuration and engaged to the locked position. Prior to engaging the device, the actuator 101 is operated to its' end of travel position, so determined by the adjustable stop travel stops 130 of the actuator 101 in the direction that it needs to be locked in.

Referring again to FIG. 18A and FIG. 18B, the device is configured as a locking device when at the actuator's 101 end position, so determined by the actuator's 101 travel stops or stroke stop bolts 130*a* or 130*b*, the adjustable stop nut 110 is so adjusted on the extension rod threads 109*b* to let the inner face 110*a* of the adjustable stop nut 110 just about to bear on the index sleeve 106 outer face 106*a*. The adjustable stop nut 110 is set at this position on the extension rod threads 109*b* such that the double D profile of the adjustable stop nut 110 aligns with the index sleeve's 106 double D bore 106*e*. A set screw 111 locks the adjustable stop nut's 110 position on the extension rod 109.

Relating to engage-disengage lock generally and referring FIG. 18A, engaging the device so configured as a locking device is effected by operating on the hand lever 131 to rotate the index sleeve 106 to its clockwise extremity upon pulling on the spring biased pin ring 132 to disengage the spring biased pin 122. Application of pressure to the actuator 101 cylinder in the said locked position results in the adjustable stop nut 110 loading on the index sleeve's 106 outer face 106*a*, thereby preventing the extension rod 109, the guide block 108 and in turn the yoke 103 from moving. The actuator 101 is thus locked out in this position. To unlock, the spring biased pin 122 is released and handle 131 is shifted to turn the index sleeve 106 counter clockwise to its extremity position determined by the engagement of the spring biased pin 122 into the radial slot 106*j* on the index sleeve flange 106*f*, to disengage the device whereby the index sleeve's 106 profiled bore 106*e* realigns with the double D profiled adjustable stop nut 110 on the extension rod 109, posing no impedance to the motion of the extension rod 109 through the index sleeve 106 and the housing 102*a*.

Relating to locking clockwise generally, referring to FIG. 16A, FIG. 17A, FIG. 17C and FIG. 18A, when the actuator is at its clockwise stroke end, so determined by the clockwise travel stop bolt or adjustable travel stop 130*a* on the actuator housing 101*a*, and when the hand lever 131 is moved to turn the index sleeve 106 to its clockwise extremity, upon releasing the safety pin 122 by pulling on the pin ring 132 to thus engaged position of the device, the index sleeve's 106 double D profiled bore 106*e* goes out of alignment and is counter posed with the adjustable stop nut's 110 double D profile. The adjustable stop nut's 110 inner face 110*a* can now only bear upon the index sleeve's 106 outer face 106*a* and cannot go through the index sleeve's double D profiled bore 106*e*. This locks up the actuator in its clockwise stroke end position.

Relating to locking counterclockwise generally, referring to FIG. 16A, FIG. 17A, FIG. 17C and FIG. 18B, when the actuator is at its counter clockwise stroke end, so determined by the counter clockwise travel stop bolt or adjustable travel stop 130*b* on the actuator housing 101*a*, and in this position when the hand lever 131 is moved upward to turn the index sleeve 106 to its clockwise extremity upon releasing the safety pin 122 by pulling on the pin ring 132 to thus engaged position of the device, the index sleeve's 106 double D profiled bore 106*e* goes out of alignment and is counter posed with the adjustable stop nut's 110 double D profile. The adjustable stop nut's 110 outer face 110*b* can now only bear upon the index sleeve's 106 inner face 106*b* and cannot go through the index sleeve's double D profiled bore 106*e*. This locks up the actuator in its counter clockwise stroke end position.

Figure 18B:
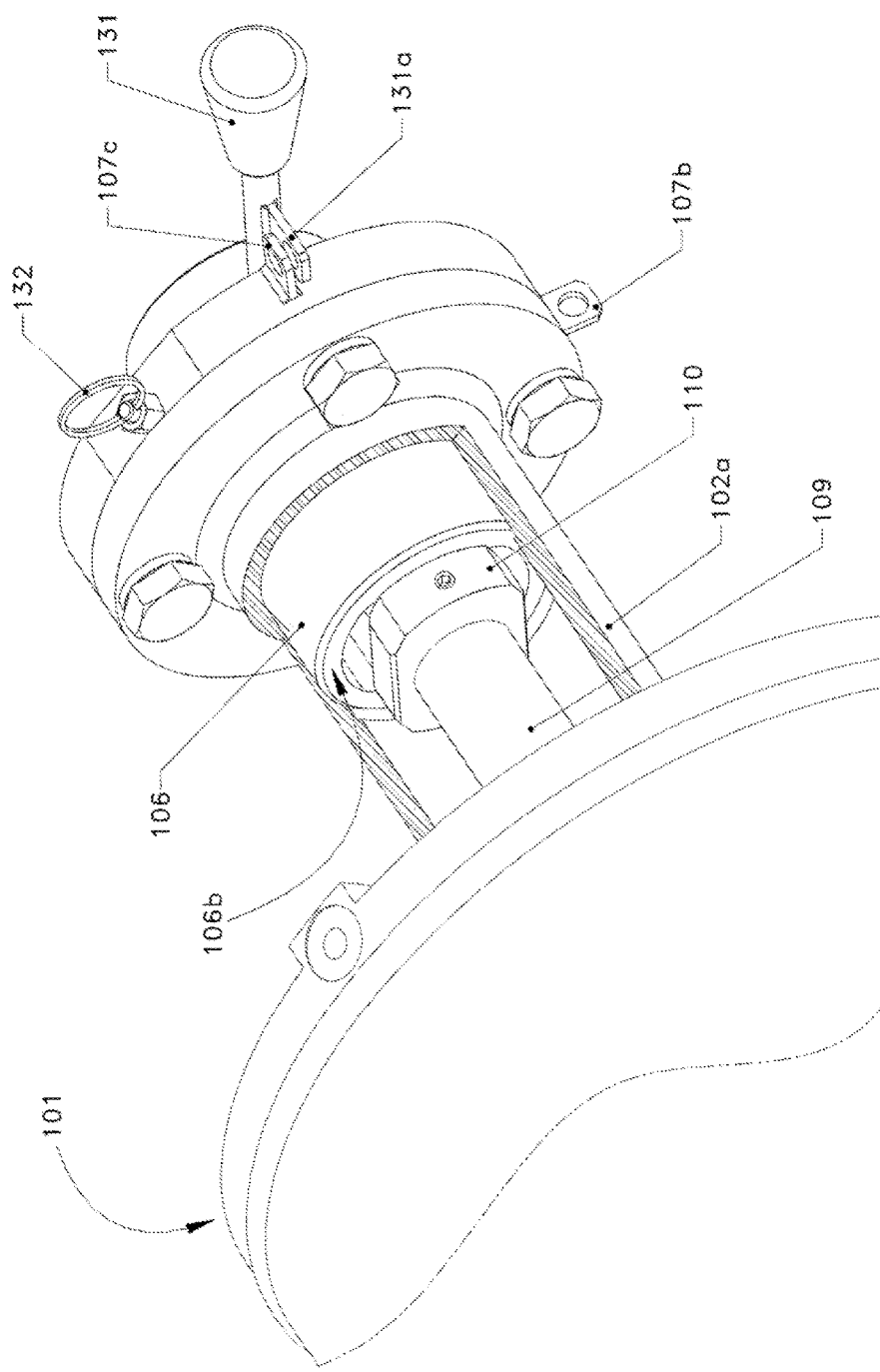
FIG. 18B is the perspective view of an exemplary embodiment of the combination device mounted on a valve actuator, configured as a lockout device in an engaged position at the other end of the actuator's travel position.
Figure 18C:
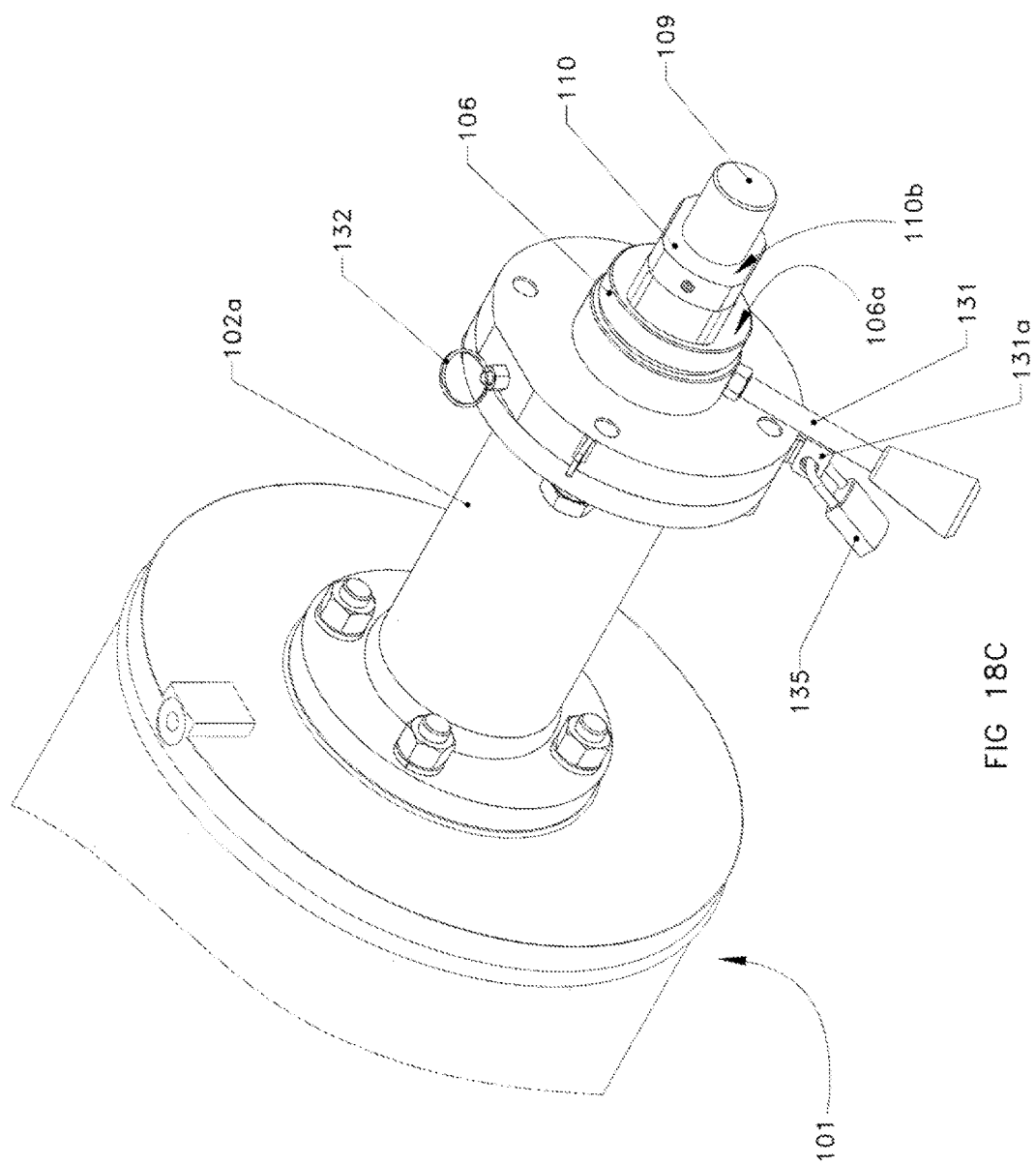
FIG. 18C is the perspective view of an exemplary embodiment of the combination device with the actuating handle locked with a padlock to prevent inadvertent or unauthorized operation of the device.

Relating to a padlock generally and referring to FIG. 18B and FIG. 18C, a tab 131*a* with a hole on the hand lever 131 lines up with the safety stops 107*b* or 107*c* with similar hole, providing a means of locking the hand lever 131 in either the engaged or disengaged positions of the device, against unauthorized operation by engaging a padlock 135 through the aligned holes in the safety stops 107*b* or 107*c*.

Relating to partial stroke testing device configuration generally, in the device's 102 other configuration as a valve partial stroke testing device, the actuator 101 is operated to its' end of travel position, so determined by the adjustable stop travel 130 of the actuator 101 and to the position that it requires to be tested in for the partial stroke test.

Referring to FIG. 17B, FIG. 19A and FIG. 19B, the device is configured as a partial stroke testing device when at the actuator's 101 end position, so determined by the actuator's 101 travel stop 130 and at the disengaged position of the device, the adjustable stop nut 110 is loosened enough and so adjusted on the extension rod threads 109*b* that there is a gap 109*c* formed between the index sleeve's outer face 106*a* and the inner face 110*a* of the adjustable stop nut 110. The width of this gap 109*c* determines the extent of the partial stroke. The adjustable stop nut 110 is so set that its double D profile aligns with the index sleeve's 106 double D profiled bore 106*e* in the disengaged position of the device. The adjustable stop nut 110 is locked in this set position by set screws 111 on the extension rod threads 109*b*. The partial stroke adjustment allows, by way of example only, twenty to thirty (20 to 30) degrees of rotation of the actuator's 101 output drive member 103. The hand lever 131 is operated to turn the index sleeve 106 to clockwise extremity to engage the device 102 into testing mode.

Relating to engage-disengage generally and referring FIG. 16A, FIG. 17B, FIG. 19A and FIG. 19B, in the test mode, so selected by shifting the device to its engaged position, application of pressure to the actuator's 101 cylinder to operate the actuator 101 counter to its said travel end position, results in the piston rod 104, the extension rod 109 and thus the adjustable stop nut 110 to move towards the index sleeve's outer face 106*a*, to the extent of the said gap 109*c* between the face 106*a* and the adjustable stop nut's inner face 110*a*. With the device turned to its engaged position, the index sleeve's 106 profiled double D bore 106*e* is counter posed to the adjustable stop nut's 110 profile and the adjustable stop nut face 110*a* now comes in contact with the index sleeve outer face 106*a* which mechanically prevents the extension rod 109 and in turn the drive member 103 from moving any further. The actuator 101 has now performed a partial stroke. To restore operation mode, the actuator is operated back to its travel end position and the hand lever 131 is shifted to the device disengaged position which turns the index sleeve 106 back in alignment with the profile of the adjustable stop nut 110, thereby posing no impedance to the full stroke motion of the extension rod 109.

Relating to partial stroke test at actuator's clockwise end generally, referring to FIG. 16A, FIG. 19A and FIG. 19B, with the actuator at its clockwise stroke end, so determined by the clockwise travel stop bolt 130*a* on the actuator housing 101*a*, and when the hand lever 131 is moved to turn the index sleeve 106 to its clockwise extremity, upon releasing the safety pin 122 by pulling on the pin ring 132 to thus engaged position of the device, the index sleeve's 106 double D profiled bore 106*e* goes out of alignment and is counter posed with the adjustable stop nut's 110 double D profile. Upon operation of the actuator 101 by application of pressure to its pneumatic cylinder to initiate counter clockwise rotation of actuator's output member 103, the extension rod 109 and adjustable stop nut 110 is pulled in the direction of piston 105 movement and the adjustable stop nut 110 moves towards the index sleeve outer face 106*a* for the distance set by the gap 109*c*. The adjustable stop nut's 110 inner face 110*a* comes in contact with index sleeve's 106 outer face 106*a* as it cannot go through the index sleeve's double D profiled bore 106*e*. This restricts the stroke of the linear motion member 112 and the stroke of the actuator to the extent of the gap 109*c* set by the adjustable stop nut 110 on the extension rod 109 at the actuator's clockwise stroke end position.

Relating to partial stroke test at actuator's counterclockwise end generally, referring to FIG. 16A, FIG. 19C, FIG. 19D and FIG. 19E, with the actuator at its clockwise stroke end, so determined by the CW travel stop bolt 130*a* on the actuator housing 101*a* and the device in disengaged position, the adjustable stop nut 110 is so adjusted on the extension rod threads 109*b* that it is in alignment with the index sleeve's double D profiled bore 106*e* and its inner face 110*b* just about bears on the index sleeve's outer face 106*a* and is locked in position by set screws 111. When the actuator is operated to its counter clockwise end position so determined by the actuator's travel stop bolt 130*b*, there would form a gap 109*d* between the index sleeve inner face 106*b* and the adjustable stop nut outer face 110*b*, see FIG. 19D. At the actuator's counter clockwise end position, the device is engaged by the hand lever 131 moved to turn the index sleeve 106 to its clockwise extremity, upon releasing the safety pin 122 by pulling on the pin ring 132 to thus engaged position of the device thereby the index sleeve's 106 double D profiled bore 106e goes out of alignment and is counter posed with the adjustable stop nut's 110 double D profile. Upon operation of the actuator 101 to initiate clockwise rotation of actuator's output member 103, the extension rod 109 and adjustable stop nut 110 moves towards the index sleeve inner face 106b for the distance set by the gap 109d. The adjustable stop nut's 110 outer face 110b comes in contact with index sleeve's 106 inner face 106b as it cannot go through the index sleeve's double D profiled bore 106e. This restricts the stroke of the linear motion member 112 and the stroke of the actuator to the extent of the gap 109d set by the adjustable stop nut 110 on the extension rod 109 at the actuator's counter clockwise stroke end position.

Relating to partial stroke test padlocking generally and referring to FIGS. 18B and 18C, a tab 131a with a hole on the hand lever 131 lines up with the safety stops 107b or 107c, providing a means of locking the hand lever 131 in either the PST engaged or disengaged positions of the device against unauthorized operation, by engaging a padlock 135 through the aligned holes in the safety stops 107b or 107c.

It is understood that the present disclosure is not limited to the particular applications and embodiments described and illustrated herein, but covers all such variations thereof as come within the scope of the claims. While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A combination device configured to effect lockout and partial stroke testing for an actuator having a piston rod providing linear motion and connected to a guide block in the actuator, and comprising:
   a device housing having a housing bore, wherein the device housing is adapted to mount on a receptacle on the actuator that aligns the housing bore coaxially to a translatory motion axis of the piston rod;
   an extension rod having a first end attached to the guide block connected to the piston rod;
   a means for restraining the movement of the extension rod in a manner that selectively limits a rotation of a driver element of the actuator, relative to an actuator housing;
   a housing cover mounted to the device housing, and a safety device mounted on the housing cover wherein the safety device is configured to prevent unintended switching of the means for restraining;
   a tubular cover to protect the extension rod; and
   wherein the safety device comprises a spring biased safety pin.

2. The combination device as defined in claim 1, wherein the device housing has a flanged end to receive the housing cover; further comprising an adjustable stop nut having a double D profile that is engaged on a second end of the extension rod and locked in set position by a set screw;
   an index sleeve with a double D profiled bore and an index sleeve flange with two index slots machined radially 90 degrees apart and the index sleeve disposed in the device housing;
   wherein the rotation of a driver element is limited when the double D profile is unaligned with the adjustable stop nut set on the second end of the extension rod;
   wherein the housing cover has a counter bore and is mounted to the flanged end of the device housing; and
   wherein the housing cover retains the index sleeve in the device housing.

3. The combination device as defined in claim 2, wherein the first end of the extension rod is attached via threading to the guide block in the actuator housing and the second end of the extension rod is also threaded, wherein an end face on the index sleeve and a face of the adjustable stop nut threaded on the second end of the extension rod define a gap between the end face on the index sleeve and the face of the adjustable stop nut.

4. The combination device as defined in claim 3, wherein the index sleeve is disposed coaxially and centred to the housing bore, and further wherein an inner face of the flange of the index sleeve bears on the flanged end of the device housing and restrains axial movement of the index sleeve into the device housing.

5. The combination device as defined in claim 4, further comprising of a recessed face of the counter bore of the housing cover, wherein the housing cover is fixedly fastened to the device housing and further wherein the housing cover envelopes the index sleeve flange with the recessed face of the housing cover bearing on an outer face of the index sleeve flange and preventing axial movement of the index sleeve out of the device housing, permitting only rotary motion of the index sleeve and preventing axial movement of the index sleeve by restraining the index sleeve with the flanged end of the device housing and the recessed face of the housing cover, wherein the flanged end of the device housing and the recessed face of the housing cover form orthogonal planar boundaries on both the inner face and the outer face of the index sleeve flange preventing the translation of the index sleeve.

6. The combination device as defined in claim 5, further comprising a hand lever joined on an extended part of the index sleeve outside of the housing cover and leveraging rotary motion of the sleeve in the housing bore, and wherein an extension tab of the hand lever has a first hole that aligns with a second hole in at least one safety stop on the housing cover at two extreme positions of the rotation of the hand lever; further comprising a padlock configured for insertion through the second hole in the safety stop and the first hole in the extension tab to lock the combination device against unauthorized operation.

7. The combination device as defined in claim 1, wherein said means for restraining the movement of the extension rod comprises two slides disposed in the device housing; and wherein the housing cover protects and retains the slides in the device housing.

8. The combination device as defined in claim 7, wherein the first end of the extension rod is attached via threading to the guide block in the actuator housing and threaded on a second end of the extension rod; further comprising a stepped down section defining a step face on the second end of the extension rod; wherein the step face on the extension rod and a thimble nut threaded on the second end of the extension rod define a groove in the extension rod between the step face and a face of the thimble nut.

9. The combination device as defined in claim 8, wherein the two slides are two identical and mirrored slides disposed symmetrically and laterally centred to the housing bore, and further wherein the slides are rectangular plates each having a leading end defining a semi-circular cut-out on each of the leading ends of the slides, wherein the semi-circular cut out defines an enveloping hole around the extension rod groove when the leading ends of the respective slides are at a position where the leading ends have respectively been uniformly moved towards each other and brought into contact.

10. The combination device as defined in claim 9, further comprising of two links respectively linked to the two slides in an identical manner; a plunger transposed and symmetrically disposed in the device housing between the two slides and the two links; wherein the plunger is configured for outward movement transverse to an axis of the extension rod, enabling motion of the slides into the extension rod groove for contact at the leading ends of the respective slides thereby forming an orthogonal planar boundary for the translation of the thimble nut on the extension rod.

11. The combination device as defined in claim 10, further comprising a handle pivotably joined at one end to a fixity on the device housing and leveraging the plunger's transverse motion by a link plate, and wherein an extension of the handle beyond a pivot point of the handle has a first hole at an end of the extension that aligns with at least a second hole in the link plate at the two extreme positions of the handle; further comprising a padlock configured for insertion through the first hole at the end of the extension and the second hole in the link plate to lock the combination device against unauthorized operation.

12. The combination device as defined in claim 10, comprising of a pneumatic cylinder mounted on a bracket fixed to the device housing, wherein the pneumatic cylinder aligns coaxially to the plunger and couples to the plunger and wherein the pneumatic cylinder is remotely controlled.

13. A method for locking out a piston rod of a pneumatic cylinder actuator in a stroke end position, comprising the steps of:
(a) defining a position for locking the actuator by adjusting an adjustable travel stop on an actuator housing, removing a tubular cover from a housing cover and adjusting a fastener out towards a free end of an extension rod and shifting a handle upwards upon pulling out a safety device, to an extreme position and releasing the safety device to retain the handle in an indexed position;
(b) adjusting the fastener to progress an inner face of the fastener for restraining and then securing a position of the fastener; and
(c) placing the tubular cover back on the housing cover.

14. The method according to claim 13, wherein the adjustable travel stop comprises a stroke stop bolt;
wherein the fastener comprises an adjustable stop nut;
wherein the safety device comprises a spring biased safety pin; and
wherein the step of adjusting and securing, comprises:
adjusting the adjustable stop nut to progress tan inner face of the adjustable stop nut towards an index sleeve until the inner face of the adjustable stop nut contacts an outer face of the index sleeve and securing a position of the adjustable stop nut by a set screw on the adjustable stop nut.

15. The method according to claim 14, further comprising the step of:
engaging a padlock through holes in an extension tab on the handle and a safety stop, to prevent unauthorized disengagement of the lockout.

16. The method according to claim 13, wherein the adjustable travel stop comprises a stroke stop bolt;
wherein the fastener comprises a thimble nut;
wherein the safety device comprises a spring biased safety pin; and
wherein the step of adjusting and securing, comprises:
adjusting the thimble nut to progress an inner face of the thimble nut towards two slides until the inner face contacts an outer face of the slides and securing a position of the thimble nut by a set screw on the thimble nut.

17. The method according to claim 16, further comprising the step of:
engaging a padlock through holes in the handle and a link plate, to prevent unauthorized disengagement of the lockout.

18. A method for configuring a device to a partial stroke test device, comprising the steps of:
(a) defining an end-of-stroke position of an actuator by adjusting an adjustable travel stop on an actuator housing, removing a tubular cover from a housing cover and adjusting a fastener out towards a free end of an extension rod and upon pulling out a safety device, shifting a handle upwards to an extreme position and releasing the safety device for retaining the handle in an indexed position;
(b) adjusting the fastener to progress an inner face of the fastener for restraining and then securing a position of the fastener; and
(c) placing the tubular cover back on the housing cover.

19. The method according to claim 18, wherein the adjustable travel stop comprises a stroke stop bolt;
wherein the fastener comprises an adjustable stop nut;
wherein the safety device comprises a biased safety pin; and
wherein the step of adjusting and securing, comprises:
adjusting the adjustable stop nut to progress an inner face of the adjustable stop nut towards an index sleeve face until the inner face of the adjustable stop nut is at a pre-determined distance from the free end of the extension rod and securing a position of the adjustable stop nut by a set screw on the adjustable stop nut.

20. The method according to claim 19, further comprising the step of engaging a padlock through at least one hole in an extension tab on the handle and in at least one safety stop, to prevent unauthorized disengagement of the test mode.

21. The method according to claim 18, wherein the adjustable travel stop comprises a stroke stop bolt;
wherein the fastener comprises a thimble nut;
wherein the safety device comprises a biased safety pin; and
wherein the step of adjusting and securing, comprises:
adjusting the thimble nut to progress an inner face of the thimble nut towards two slides until the inner face of the thimble nut is at a pre-determined distance from the free end of the extension rod and securing a position of the thimble nut by a set screw on the thimble nut.

22. The method according to claim 21, further comprising the step of engaging a padlock through at least one hole in the handle and a link plate, to prevent unauthorized disengagement of the test mode.

* * * * *